(12) United States Patent
Sung et al.

(10) Patent No.: US 12,713,377 B1
(45) Date of Patent: Aug. 18, 2026

(54) EDGE DEVICE REGISTRATION FOR INTEGRATION WITH A DATA INTAKE SYSTEM

(71) Applicant: Cisco Technology, Inc., San Jose, CA (US)

(72) Inventors: Alan Sung, Richmond Hill (CA); Anthony Ng, Toronto (CA); Jonathan Yeung, Mississauga (CA); Neel Mehta, Toronto (CA); Joel Jacob, Etobicoke (CA); Rodrigo Paulo Quaresma, Burlington (CA); Warren Shum, Mississauga (CA); William Huang, Vaughan (CA); Yi Chien Lee, Oakville (CA); Masrur Mahmood, Mississauga (CA); Allyson Aberg, Toronto (CA); Qi Shu, Markham (CA); Neha Kumari, Richmond Hill (CA)

(73) Assignee: Cisco Technology, Inc., San Jose, CA (US)

( * ) Notice: Subject to any disclaimer, the term of this patent is extended or adjusted under 35 U.S.C. 154(b) by 299 days.

(21) Appl. No.: 18/308,438

(22) Filed: Apr. 27, 2023

Related U.S. Application Data

(60) Provisional application No. 63/482,534, filed on Jan. 31, 2023.

(51) Int. Cl.
*H04W 60/00* (2009.01)
*H04W 12/04* (2021.01)
*H04W 12/088* (2021.01)

(52) U.S. Cl.
CPC .......... *H04W 60/00* (2013.01); *H04W 12/04* (2013.01); *H04W 12/088* (2021.01)

(58) Field of Classification Search
CPC .... H04W 60/00; H04W 12/088; H04W 12/04
See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |

(Continued)

OTHER PUBLICATIONS

Splunk Enterprise 8.0.0 Overview, available online, retrieved May 20, 2020 from docs.splunk.com.

(Continued)

*Primary Examiner* — Mewale A Ambaye
(74) *Attorney, Agent, or Firm* — Kilpatrick Townsend & Stockton LLP

(57) ABSTRACT

An edge device equipped with sensors may be used to monitor a surrounding environment. The edge device may be registered with a data intake and query system using a mobile device. The edge device may broadcast an access point on a first wireless network and provide credentials for the first wireless network to the mobile device. Using these credentials, the mobile device may provide additional credentials for a second network. The edge device may then connect to the second network. Secure communications may then be made via the endpoint with the mobile device to register the edge device with a user account.

20 Claims, 12 Drawing Sheets

(56) References Cited

U.S. PATENT DOCUMENTS

| | | | | |
|---|---|---|---|---|
| 2005/0021781 | A1* | 1/2005 | Sunder | H04W 12/06 709/229 |
| 2006/0165060 | A1* | 7/2006 | Dua | G06Q 20/322 705/76 |
| 2010/0199341 | A1* | 8/2010 | Foti | H04N 21/6187 726/9 |
| 2012/0284637 | A1* | 11/2012 | Boyer | G06Q 10/109 715/751 |
| 2013/0173702 | A1* | 7/2013 | Lang | H04W 12/08 709/204 |
| 2018/0205540 | A1* | 7/2018 | Smith | H04L 63/065 |
| 2018/0278597 | A1* | 9/2018 | Helms | H04N 21/2543 |
| 2018/0331828 | A1* | 11/2018 | Pakkan | H04L 41/0883 |
| 2019/0098106 | A1 | 3/2019 | Mungel et al. | |
| 2020/0065300 | A1* | 2/2020 | Yang | G06F 16/215 |
| 2020/0274868 | A1* | 8/2020 | Passaglia | G06K 7/1413 |
| 2020/0359218 | A1* | 11/2020 | Lee | H04W 12/63 |
| 2021/0203684 | A1* | 7/2021 | Maor | H04L 63/1433 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, “Exploring Splunk,” published by CITO Research, New York, NY, Apr. 2012.

Bitincka, Ledion et al., “Optimizing Data Analysis with a Semi-structured Time Series Database,” self-published, first presented at “Workshop on Managing Systems via Log Analysis and Machine Learning Techniques (SLAML)”, Vancouver, British Columbia, Oct. 3, 2010.

* cited by examiner

354
Encrypted
Computing Device(s) 104
464
358
Encrypted
Data Intake and Query System 110
350
352

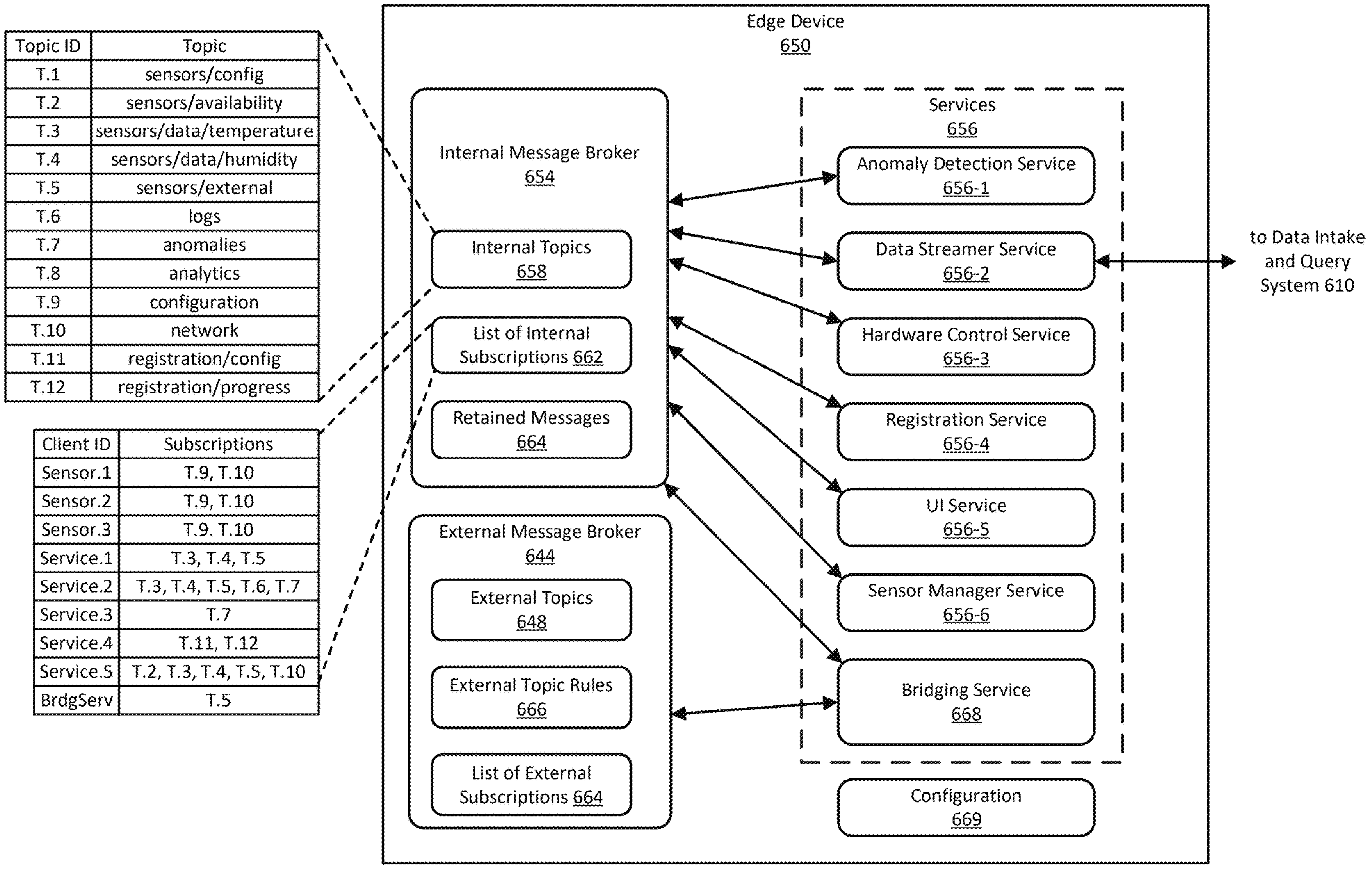

| Topic ID | Topic |
|---|---|
| T.1 | sensors/config |
| T.2 | sensors/availability |
| T.3 | sensors/data/temperature |
| T.4 | sensors/data/humidity |
| T.5 | sensors/external |
| T.6 | logs |
| T.7 | anomalies |
| T.8 | analytics |
| T.9 | configuration |
| T.10 | network |
| T.11 | registration/config |
| T.12 | registration/progress |

| Client ID | Subscriptions |
|---|---|
| Sensor.1 | T.9, T.10 |
| Sensor.2 | T.9, T.10 |
| Sensor.3 | T.9. T.10 |
| Service.1 | T.3, T.4, T.5 |
| Service.2 | T.3, T.4, T.5, T.6, T.7 |
| Service.3 | T.7 |
| Service.4 | T.11, T.12 |
| Service.5 | T.2, T.3, T.4, T.5, T.10 |
| BrdgServ | T.5 |

FIG. 6

EDGE DEVICE REGISTRATION FOR INTEGRATION WITH A DATA INTAKE SYSTEM

CROSS REFERENCE PARAGRAPH FOR PRIORITY

This application is a non-provisional application and claims the benefit and priority of U.S. Provisional Application No. 63/482,534, filed on Jan. 31, 2023, and titled "EDGE DEVICE REGISTRATION FOR INTEGRATION WITH A DATA INTAKE SYSTEM," which is hereby incorporated by reference in its entirety for all purposes.

BACKGROUND

Information technology (IT) environments can include diverse types of data systems that store large amounts of diverse data types generated by numerous devices. For example, a large data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing structured, semi-structured, and unstructured data relevant to any search query can be massive, and continues to grow rapidly. This technological evolution can give rise to various challenges in relation to collecting, managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing. Collecting and storing massive quantities of minimally processed or unprocessed data for later retrieval and analysis is becoming increasingly more feasible as new techniques are developed.

BRIEF SUMMARY

In some embodiments, a computer-implemented method may include broadcasting, by an edge device, a first wireless network through an access point as part of a registration procedure for registering the edge device with a user account for a data intake and query system. The method may also include exposing, by the edge device, an endpoint on the first wireless network, wherethe endpoint may be configured to exchange Hypertext Transfer Protocol (HTTP) requests for the registration procedure. The method may additionally include receiving, by the edge device, network credentials for a second network, where the network credentials may be received through the access point from a mobile device being used to perform at least a part of the registration procedure. The method may further include connecting, by the edge device, to the second network using the network credentials provided from the mobile device. The method may also include completing, by the edge device, at least a portion of the registration procedure through the endpoint.

In some embodiments, an edge device may include one or more processors and one or more non-transitory, computer-readable media having stored thereon instructions that, when executed by the one or more processors, cause the one or more processors to perform operations that may include broadcasting, by an edge device, a first wireless network through an access point as part of a registration procedure for registering the edge device with a user account for a data intake and query system. The operations may also include exposing, by the edge device, an endpoint on the first wireless network, where the endpoint may be configured to exchange Hypertext Transfer Protocol (HTTP) requests for the registration procedure. The operations may additionally include receiving, by the edge device, network credentials for a second network, where the network credentials may be received through the access point from a mobile device being used to perform at least a part of the registration procedure. The operations may further include connecting, by the edge device, to the second network using the network credentials provided from the mobile device. The operations may also include completing, by the edge device, at least a portion of the registration procedure through the endpoint.

In some embodiments, one or more non-transitory, computer-readable media may have stored thereon instructions that, when executed by one or more processors, cause the one or more processors to perform operations including broadcasting, by an edge device, a first wireless network through an access point as part of a registration procedure for registering the edge device with a user account for a data intake and query system. The operations may also include exposing, by the edge device, an endpoint on the first wireless network, where the endpoint may be configured to exchange Hypertext Transfer Protocol (HTTP) requests for the registration procedure. The operations may additionally include receiving, by the edge device, network credentials for a second network, where the network credentials may be received through the access point from a mobile device being used to perform at least a part of the registration procedure. The operations may further include connecting, by the edge device, to the second network using the network credentials provided from the mobile device. The operations may also include completing, by the edge device, at least a portion of the registration procedure through the endpoint.

In any embodiments, any of the following features may be implemented in any combination and without limitation. The endpoint may be configured for secure communication using HTTP by exchanging encryption keys with the mobile device. The endpoint may be configured to not require Hypertext Transfer Protocol Secure (HTTPS) or other transport layer security protocols. The endpoint may provide a Representational State Transfer (REST) endpoint configured to exchange information with the mobile device as part of the registration procedure for registering the edge device. The mobile device and the edge device may communicate directly via the endpoint on the first wireless network. The method/operations may also include scanning, by the edge device, available wireless networks that are detectable by the edge device, and characterizing the available wireless networks based on a signal strength. The method/operations may also include filtering, by the edge device, the available wireless networks based on one or more security protocols; and/or providing, by the edge device, a filtered list of the available wireless networks to the mobile device via the endpoint. The edge device may also include a housing surrounding the one or more processors and the one or more non-transitory, computer-readable media; and a display configured to display information for the registration procedure.

The method/operations may also include providing, by the edge device, access point credentials to the mobile device, where the access point credentials may allow the mobile device to connect to the edge device through the access point. The method/operations may also include encoding the access point credentials into a graphical code that is displayed on the display of the edge device. The edge device may be one of a plurality of edge devices registered with the user account, and the plurality of edge devices may include sensors that are configured to log data from a surrounding environment. The method/operations may also include exposing, by the edge device, API functions on the endpoint through which settings are received for connecting to an enterprise network. The method/operations may also include running, by the edge device, a Web server, where a URL for the Web server may be provided on a display screen of the edge device. The method/operations may also include receiving, by the edge device, a configuration for the edge device to configure operation of sensors and services operated by the edge device; and causing, by the edge device, the configuration to be transmitted to be stored with the user account to update other edge devices registered with the user account. The configuration may include an algorithm used to detect anomalies based on sensor data received by the edge device. The method/operations may also include receiving, by the edge device, a configuration as part of the registration procedure, where the configuration may have been received from another edge device registered with the user account; and configuring the edge device using the configuration. The method/operations may also include after completing the registration procedure, receiving, by the edge device, a change to a configuration of the edge device; and in response to receiving the change to the configuration, transmitting, by the edge device, the configuration to the user account to be transmitted to other edge devices registered with the user account.

BRIEF DESCRIPTION OF THE DRAWINGS

Illustrative examples are described in detail below with reference to the following figures:

FIG. 6 provides examples and descriptions of topics, subscriptions, and other configurable settings, according to some embodiments.

DETAILED DESCRIPTION

Figure 1:
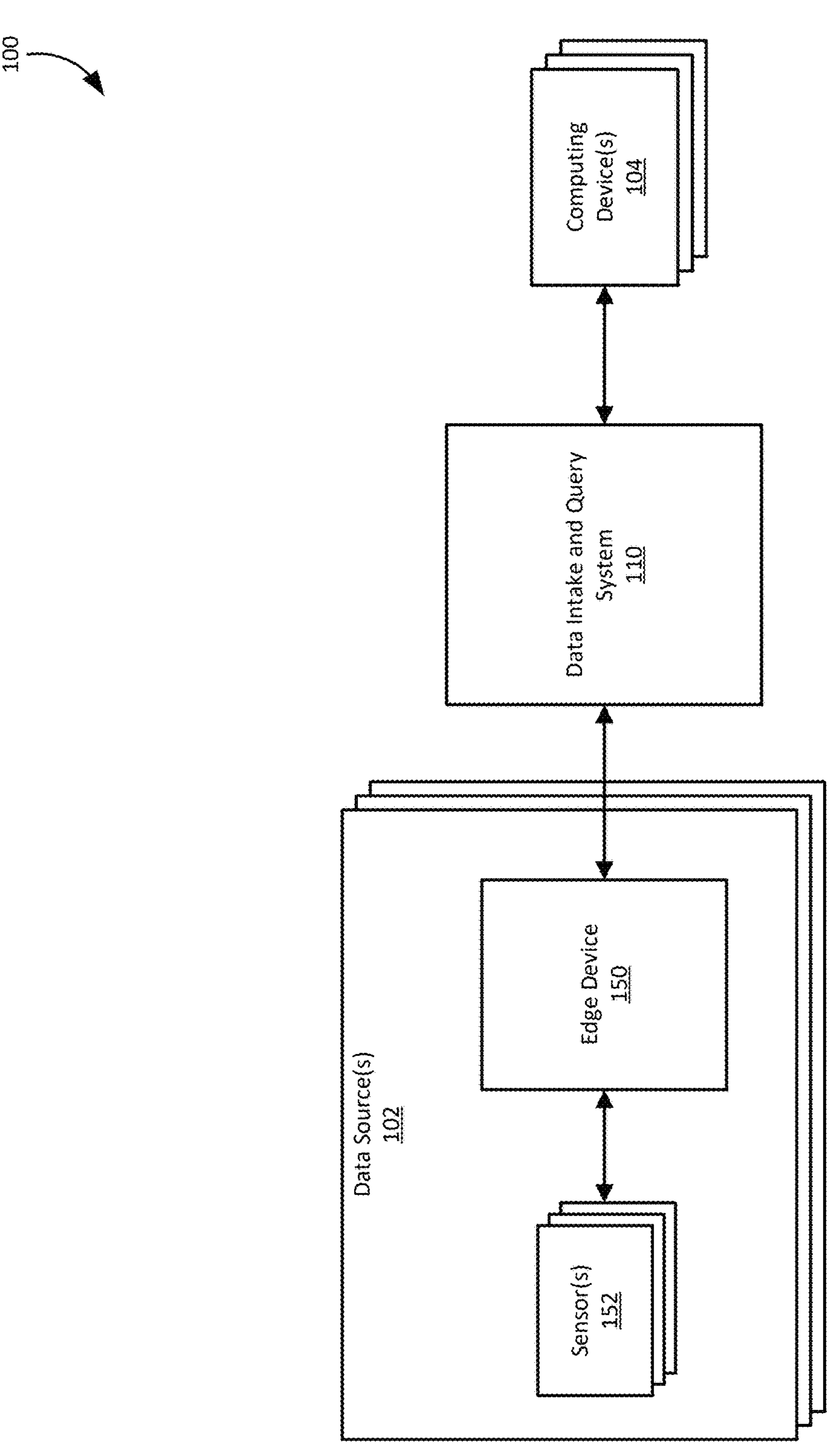
FIG. 1 illustrates a block diagram of an example data processing environment, according to some embodiments.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of techniques are used to collect and analyze machine data. For example, edge devices coupled with sensors can be deployed within the IT environment to collect machine data and send the machine data to a data intake and query system. In such configurations, the edge devices and sensors function as data sources for the data intake and query system. The system may then parse the machine data to produce events each having a portion of machine data associated with a timestamp, and then store the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

At the edge device, typically a number of services are run to manage the movement of the machine data as it is captured by the sensors and is transmitted by the edge device to the data intake and query system. In some instances, the services may communicate with each other as well as with the sensors using a particular messaging protocol. In some cases, sensors and/or services can communicate using one or more conventional messaging protocols. In other cases, sensors and/or services can communicate using proprietary messaging protocols and/or messaging procedures developed for the edge device to enable efficient delivery of data to a data intake and query system. Some such messaging procedures and messaging protocols are described in U.S. patent application Ser. No. 17/733,176, titled "Messaging Procedure at Edge Device for Delivery of Data to Intake System," filed on Apr. 29, 2022, which is incorporated herein in its entirety. For example, the edge device may include a system memory that has instructions stored therein for executing a message broker and a set of services. The message broker provides communication between a number of clients, which include the services running on the edge device as well as one or more sensors coupled to the edge device. The message broker may implement a topic-based publish-subscribe protocol in which messages are published by clients to certain topics and published messages are delivered to the clients that are subscribed to those topics. Each client may subscribe to one or more of the topics and the message broker may track these subscriptions by maintaining and updating a list of subscriptions. In some examples, the Message Queuing Telemetry Transport (MQTT) protocol is used to implement message brokers described herein.

In some examples, a configuration file that contains configuration data may be loaded onto the edge device after it is received from an external sender. The configuration data, which may be unpackaged by a data streamer service running on the edge device, may indicate which topics the data streamer service is to subscribe to and may further provide other instructions for modifying the operation of other services and sensors. In one example, the configuration data may include a request for anomaly data associated with a particular type of sensor data, and accordingly the data streamer service may subscribe to a topic for detected anomalies and an anomaly detection service may subscribe to a topic for that particular type of sensor data. Thereafter, the data streamer service may begin receiving published messages from the anomaly detection service that indicate whether an anomaly has been detected.

In another example, the configuration data may include a request for a particular type of sensor data and a particular measurement rate for that type of sensor data (e.g., a request for temperature measurements at 0.5 Hz), and accordingly the data streamer service may subscribe to a topic for that particular type of sensor data and may further send a message to the sensor(s) to make measurements at the particular measurement rate. After subscribing to the topic for the particular type of sensor data, the data streamer service may begin receiving published messages that include sensor data and measurements for the particular type of sensor data. The sensor data may then be sent in the form of output data from the data streamer service to the data intake and query system or to some other external recipient over one or more networks.

FIG. 1 illustrates a block diagram of an example data processing environment 100, according to some embodiments. In the illustrated example, the data processing environment 100 includes one or more data sources 102, a data intake and query system 110, and one or more computing devices 104 (alternatively referred to as "client devices" or "client computing devices"). Each of the data sources 102 may include an edge device 150 that is communicatively coupled with one or more internal and/or external sensors 152. In some examples, the data processing environment 100 may be alternatively referred to as a "computing environment".

The data intake and query system 110, edge devices 150, and computing devices 104 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a computing device 104 can communicate with an edge device 150 via one or more networks. For example, if the edge device 150 is configured as a web server and the computing device 104 is a laptop, the laptop can communicate with the web server to view a website.

The computing devices 104 can correspond to distinct computing devices that can configure, manage, or send queries to the system 110. Examples of the computing devices 104 may include, without limitation, smart phones, tablet computers, handheld computers, wearable devices, laptop computers, desktop computers, servers, portable media players, gaming devices, or other device that includes computer hardware (e.g., processors, non-transitory computer-readable media, etc.) and so forth. In certain cases, the computing devices 104 can include a hosted, virtualized, or containerized device, such as an isolated execution environment, that shares computing resources (e.g., processor, memory, etc.) of a particular machine with other isolated execution environments.

The computing devices 104 can interact with the system 110 and/or the edge devices 150 in a variety of ways. For example, the computing devices 104 can communicate with the system 110 and/or the edge devices 150 over an Internet (Web) protocol, via a gateway, via a command line interface, via a software developer kit (SDK), a standalone application, etc. As another example, the computing devices 104 can use one or more executable applications or programs to interface with the system 110.

The data sources 102 can correspond to distinct computing devices or systems that include or have access to data that can be ingested, indexed, and/or searched by the system 110. The data sources 102 can include, but are not limited to, servers, routers, personal computers, mobile devices, internet of things (IoT) devices, factory machinery, industrial equipment, personal or commercial appliances, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory computer-readable media, etc.). In some examples, the edge devices 150 may receive the data from the sensors 152 that is to be processed by the system 110. As such, each one of the edge devices 150 and its associated sensors 152 may constitute one of the data sources 102.

The types of data that are generated by each of the data sources 102 (and consequently by each of the edge devices 150) can include machine data such as, for example and without limitation, server log files, activity log files, configuration files, messages, network packet data, performance measurements, sensor measurements, etc. In some cases, one or more applications executing on the edge devices 150 may generate various types of machine data during operation. For example, a web server application executing on one of the edge devices 150 may generate one or more web server logs detailing interactions between the web server and any number of the computing devices 104 or other devices.

As another example, one of the edge devices 150 may be implemented as an access point and may generate one or more logs that record information related to network traffic managed by the access point. As yet another example, an edge device 150 may handle Simple Network Management Protocol (SNMP) data polling requests to other devices in the network and save this data in an internal database. These data may be sent directly to the data intake and query system 110 as logs that record information related to requests sent from other devices (e.g., web servers, application servers, client devices, etc.). Similarly, one of the edge devices 150 may generate and/or store computing resource utilization metrics, such as, but not limited to, CPU utilization, memory utilization, number of processes being executed, etc. Any one or any combination of the files or data generated in such cases can be used as a data source for the system 110.

As used herein, obtaining data from one of the data sources 102 may refer to communicating with one of the edge devices 150 to obtain data from the edge device 150 (e.g., from the sensors 152 associated with the edge device 150 or some other data streams or directories on the edge device 150, etc.). For example, obtaining data from one of the data sources 102 may refer to requesting data from one of the edge devices 150 and/or receiving data from the edge device 150. In some such cases, the edge device 150 can retrieve and return the requested data and/or the system 110 can retrieve the data from the edge device 150 (e.g., from a particular file stored on the edge device 150).

The data intake and query system 110 can ingest, index, and/or store data from heterogeneous data sources and/or edge devices 150. For example, the system 110 can ingest, index, and/or store any type of machine data, regardless of the form of the machine data or whether the machine data matches or is similar to other machine data ingested, indexed, and/or stored by the system 110. In some cases, the system 110 can generate events from the received data, group the events, and store the events in buckets. The system 110 can also search heterogeneous data that it has stored, or search data stored by other systems (e.g., other system 110 systems or other non-system 110 systems). For example, in response to received queries, the system 110 can assign one or more components to search events stored in the storage system or search data stored elsewhere.

As described herein in greater detail below, the system 110 can use one or more components to ingest, index, store, and/or search data. In some embodiments, the system 110 is implemented as a distributed system that uses multiple components to perform its various functions. For example, the system 110 can include any one or any combination of an intake system to ingest data, an indexing system to index the data, a storage system to store the data, and/or a query system (or search system) to search the data, etc. In some cases, the components of the system 110 are implemented as distinct computing devices having their own computer hardware (e.g., processors, non-transitory computer-readable media, etc.) and/or as distinct hosted devices (e.g., isolated execution environments) that share computing resources or hardware in a shared computing resource environment.

The intake system can receive data from the edge devices 150, perform one or more preliminary processing operations on the data, and communicate the data to the indexing system, query system, storage system, or to other systems (which may include, for example, data processing systems, telemetry systems, real-time analytics systems, data stores, databases, etc., any of which may be operated by an operator of the system 110 or a third party). Given the amount of data that can be ingested by the intake system, in some embodiments, the intake system can include multiple distributed computing devices or components working concurrently to ingest the data. The preliminary processing operations performed by the intake system can include, but is not limited to, associating metadata with the data received from the edge devices 150, extracting a timestamp from the data, identifying individual events within the data, extracting a subset of machine data for transmittal to the indexing system, enriching the data, etc.

In some environments, a user of a system 110 may install and configure, on computing devices owned and operated by the user, one or more software applications that implement some or all of the components of the system 110. For example, with reference to FIG. 1, a user may install a software application on server computers owned by the user and configure each server to operate as one or more components of the intake system, indexing system, query system, shared storage system, or other components of the system 110. This arrangement generally may be referred to as an "on-premises" solution. That is, the system 110 is installed and operates on computing devices directly controlled by the user of the system 110. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 110 operate.

In certain examples, one or more of the components of the system 110 can be implemented in a shared computing resource environment. In this context, a shared computing resource environment or cloud-based service can refer to a service hosted by one or more computing resources that are accessible to end users over a network, for example, by using a web browser or other application on a client device to interface with the remote computing resources. For example, a service provider may provide a system 110 by managing computing resources configured to implement various aspects of the system and by providing access to the system to end users via a network. Typically, a user may pay a subscription or other fee to use such a service. Each subscribing user of the cloud-based service may be provided with an account that enables the user to configure a customized cloud-based system based on the user's preferences.

Implementing the system 110 in a shared computing resource environment can provide a number of benefits. In some cases, implementing the system 110 in a shared computing resource environment can make it easier to install, maintain, and update the components of the system 110. For example, rather than accessing designated hardware at a particular location to install or provide a component of the system 110, a component can be remotely instantiated or updated as desired. Similarly, implementing the system 110 in a shared computing resource environment or as a cloud-based service can make it easier to meet dynamic demand. For example, if the system 110 experiences significant load at indexing or search, additional compute resources can be deployed to process the additional data or queries. In an "on-premises" environment, this type of flexibility and scalability may not be possible or feasible.

Figure 2:
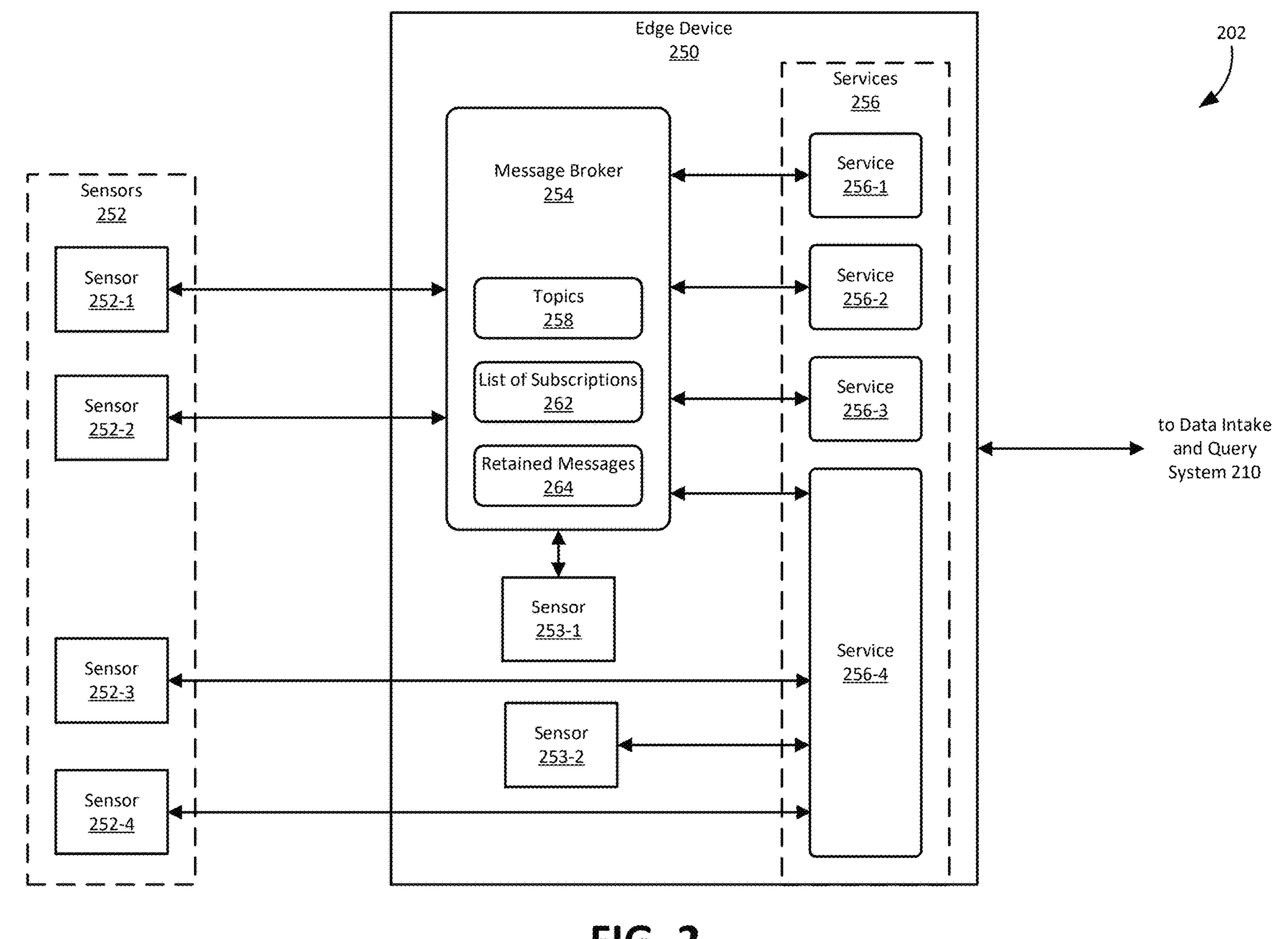
FIG. 2 illustrates a block diagram of an example data source, according to some embodiments.

FIG. 2 illustrates a block diagram of an example data source 202, according to some embodiments. In the illustrated example, the data source 202 includes an edge device 250 that may include internal sensors 253 and may be communicatively coupled to a set of external sensors 252. The edge device 250 may include various hardware elements and software application programs that may be used by the hardware elements. For example, the edge device 250 may include a message broker 254 and a set of services 256 that are configured to run on the edge device 250. For example, instructions for executing the message broker 254 and the services 256 may be stored on the system memory of the edge device 250 and, upon startup of the edge device 250, these instructions may be sequentially loaded into one or more processors of the edge device 250 so that these programs are caused to run on the edge device 250 to carry out the functionalities described below. In some examples, the edge device 250 is physically installed at an edge of a network of computational devices. For example, the edge device 250 is a physical "box" with a housing configured to be installed in a data center, on an equipment rack, on an equipment shelf, or the like. These instructions may further include operations that register the edge device 250 with the system 110. Registration of the edge device 250 is described in greater detail below.

The message broker 254 is executed by the edge device 250 to provide communication between the various software and hardware entities within the data processing environment. For example, the message broker 254 may receive and send messages between several clients in accordance with a publish-subscribe network protocol. In some examples, the message broker 254 may implement a topic-based publish-subscribe protocol in which messages are published by clients on certain topics and the published messages are delivered by the message broker 254 to the clients that are subscribed to those topics. In one example, the message broker 254 is implemented according to the MQTT protocol. In other examples, the message broker 254 is implemented according to any suitable publish-subscribe-type of messaging protocol. Clients may subscribe to one or more topics and the message broker 254 may track these subscriptions by maintaining a list of each subscription.

The message broker 254 may directly or indirectly communicate with a number of clients, which may include one or more of the sensors 252, 253 and one or more of the services 256. Each of the clients may subscribe to one of a number of topics 258 that are maintained by the message broker 254. The topics 258 may be a file or data structure that is prepopulated with the possible topics to which a client may subscribe or, in some examples, the topics 258 may be updated over time. For example, additional topics may be added to the topics 258 once the topic is first subscribed or published to, and topics may be removed from the topics 258 once the last client unsubscribes from the topic.

The message broker 254 may maintain a list of subscriptions 262 to track the client subscriptions. In general, the list of subscriptions 262 may include one or more subscriptions that indicate which of the set of clients are subscribed to which of the topics 258. The list of subscriptions 262 may be a file or data structure that is prepopulated with the subscriptions or, in some examples, is updated over time by, for example, adding a subscription each time a client subscribes to a topic to which the client was not previously subscribed, and removing a subscription each time a client unsubscribes from a topic. As described above, a client may subscribe to a topic that is previously listed in the topics 258 or is a new topic that may then be added to the topics 258.

In some examples, the message broker 254 may maintain a set of retained messages 264 that includes recent published messages received by the message broker 254. In some examples, the retained messages 264 may be used to allow newly-subscribed clients to a topic to receive messages that were published prior to the clients being subscribed. In some examples, the publish-subscribe protocol may not require that at least one client must first be subscribed to a particular topic before any message can be published to that topic, and therefore a client that publishes a message has no guarantee that a subscribing client actually receives the message. By maintaining the retained messages 264, clients may receive messages that they would otherwise have missed and, furthermore, a published message may be more likely to be received by a desired recipient. In various examples, the retained messages 264 may store the N most recently published messages, all messages published within the last T amount of time, or the N most recently published messages received within the last T amount of time, among other possibilities.

As noted above, clients of the message broker 254 may include any of the sensors 252, 253 and any of the services 256. In various examples, one or more of the sensors 252, 253 may be clients of the message broker 254 via direct communication with the message broker 254 or via one of the services 256 that may act as an intermediary between the message broker 254 and the sensors 252, 253. For example, in the illustrated embodiment, the sensors 252-1, 252-2, and 253-1 may be clients of and may communicate directly with the message broker 254, while the sensors 252-3, 252-4, and 253-2 may be clients of the message broker 254 and may communicate via service 256-4, which may act as a sensor manager service that causes a connected sensor to perform various actions that change the operation of the connected sensor (e.g., turn on/off the sensor, increase/decrease the rate that sensor data is captured or transmitted).

Further in the illustrated example, the services 256-1, 256-2, and 256-3 may be clients of the message broker 254 and may communicate directly with the message broker (e.g., by virtue of being executed on the same hardware). The services 256 may publish messages on certain topics and subscribe to certain topics so as to receive messages published to those topics. One or more of the services 256 may communicate with a data intake and query system 110 by, for example, receiving requests from the system 110 to subscribe to certain topics that the system 110 is interested in, and transmit messages published on those topics to the system 110.

The sensors 252, 253 may include one or more of a variety of sensor types such as, without limitation, a light sensor, an image capture sensor, a sound sensor, a vibration sensor, an accelerometer, a gyroscope, a pressure sensor, a humidity sensor, a gas sensor, a location sensor, among other possibilities. The illustrated sensors 252, 253 can be physically disposed internal to, and/or external to the edge device 250. For example, the sensors internal 253 may include an internally disposed vibration sensor, and/or the external sensors 252 may include an externally disposed vibration sensor that provide vibration measurements within the edge device 250 and of the external environment, respectively. Externally disposed sensors may provide measurement data corresponding to a target device that is located within the data processing environment, such as a server computer, to which one or more of the sensors 252 are attached.

When the edge device is first received at a location for installation and integration with the system 110, the edge device may be in what is referred to as an "unregistered" state. When the edge device is unregistered, this may imply one or more of the following conditions. An unregistered edge device may not be configured to have an active network or Internet connection to communicate with a local router or with the system 110. An unregistered edge device may also be unregistered with the system 110 as a valid and/or trusted edge device. For example, the unregistered edge device may be unable to communicate with the system 110, may be unassociated with a user account at the system 110, and/or may be unregistered with a cloud service configured to receive information on behalf of the system 110. The unregistered state may be considered a default state or assumed state when the edge device is being installed or initially being configured to communicate with the system 110.

A technical problem exists in previous systems that are considered unregistered during initial installation or at any other point during the operation of the edge device. Specifically, since the unregistered edge device is not communicatively connected to a local router or other communication network (e.g., the Internet), a secure and reliable method of initially registering the edge device with the system 110 and establishing wireless communications for the edge device is needed. In order to register an unregistered edge device, some embodiments described herein may provide a mobile application that allows a user to initially communicate with the edge device. The mobile application may be configured to communicate directly with the edge device through an access point. The mobile application may configure the edge device 350 in order to expose an endpoint and thereby communicate through a network connection with the system 110.

Figure 3:
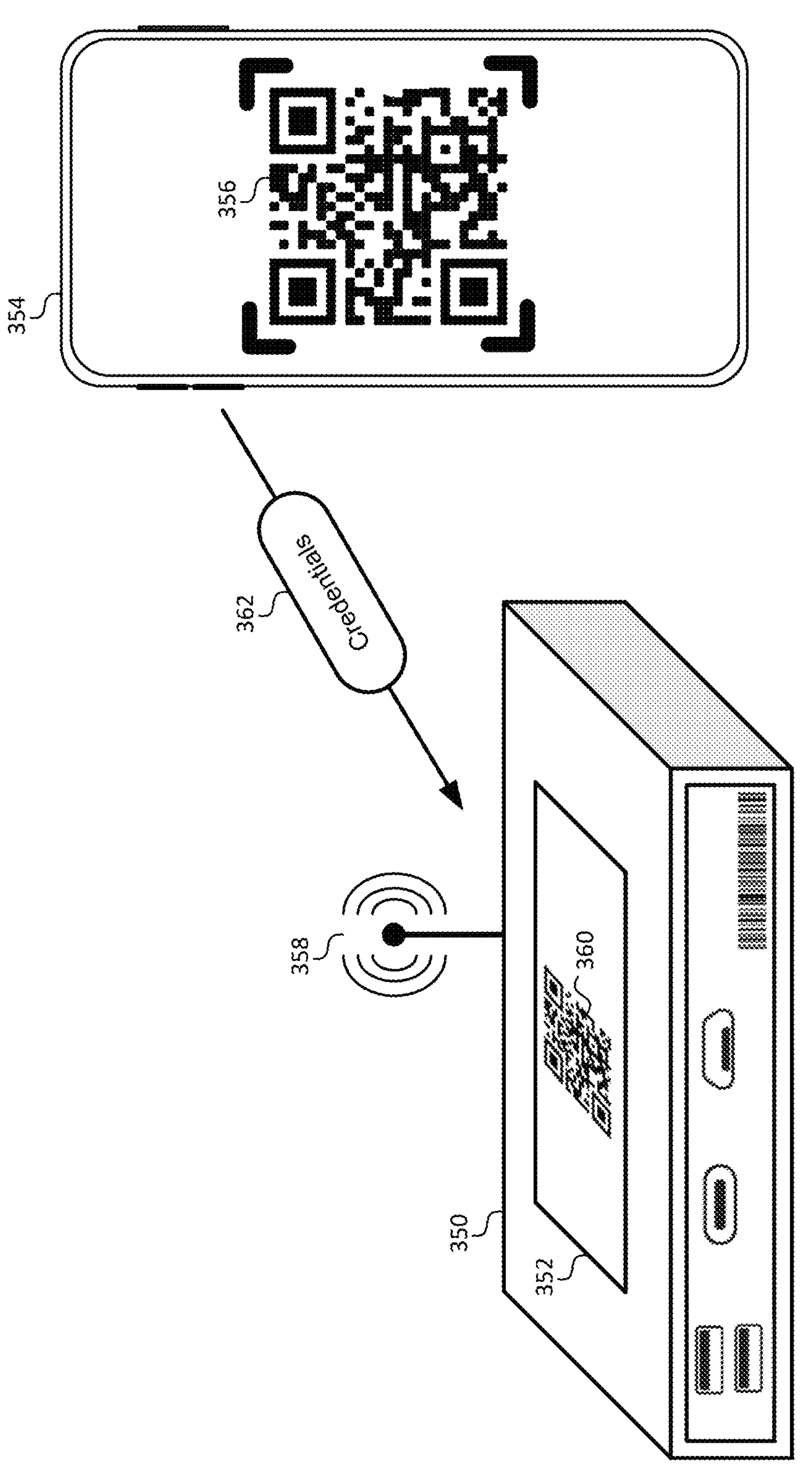
FIG. 3 illustrates a block diagram of an example edge device and a mobile device, according to some embodiments.

FIG. 3 illustrates a block diagram of another example edge device 350 and a mobile device 354, according to some embodiments. Except as otherwise described, the edge device 350 may operate in the same manner as the edge device 250 of FIG. 2 and/or the edge device 150 of FIG. 1. The edge device 350 may include the electronics described above encased in a housing formed from any type of plastic, metal, or other housing material. The housing may include a display 352 that is configured to provide information from the edge device 350 to a user. For example, the display 352 may include an LED display, an LCD display, or any other type of display technology. The display 352 may be configured to provide a wide variety of information to the user. For example, the display 352 may provide status information for the internal and/or external sensors of the edge device 350. The display 352 may provide configuration or status information for the edge device 350 itself, including power, connectivity status, and so forth. In some embodiments, the display may be interactive, using technology such as a touchscreen to receive inputs from users. For example, the display 352 may provide a touchscreen keyboard that allows the user to enter information through the display 352 as an input to be processed by the edge device 350. Alternatively, the edge device 350 may provide other inputs/output ports, such as USB ports, along with other options for providing inputs to the edge device 350 and receiving outputs from the edge device 315.

FIG. 3 also illustrates a mobile device 354. The mobile device 354 may be implemented using any type of computing device. For example, the mobile device 354 may include a handheld device such as a smart phone, a tablet computer, a smart watch, and so forth. The mobile device 354 may also be implemented using other computing systems, such as laptop computers, notebook computers, personal data assistants, and so forth. The mobile device 354 may include a wireless communication module that allows the mobile device 354 to communicate wirelessly with local networks. For example, the mobile device 354 may be configured to communicate wirelessly with a local Internet router via the 802.11 communication protocol. The mobile device 354 may also include a cellular communication module that allows the mobile device 354 to communicate wirelessly with a cellular network (e.g., 4G, 5G, etc.). The mobile device 354 may also include communication modules that facilitate communication with other local wireless devices, such as a wireless fidelity (WiFi) transceiver radio or interface, a Bluetooth™ transceiver radio or interface, a Zigbee™ transceiver radio or interface, an Ultra-Wideband (UWB) transceiver radio or interface, a WiFi-Direct transceiver radio or interface, a Bluetooth™ Low Energy (BLE) transceiver radio or interface, a Thread™ interface, and/or any other wireless network transceiver radio or interface that allows the sensor to communicate with the edge device 350, and so forth.

In order to facilitate the registration of the edge device 350, the mobile device 345 may leverage the credentials that are already stored on the mobile device 354. For example, the mobile device 354 may already store credentials for connecting to a local wireless network that may serve as the main communication medium for the edge device 350 when communicating with the rest of the system 110 during normal operations after the registration procedure. This may include a network ID (e.g., a Service Set Identifier (SSID)), a username, a password, and/or other credentials for connecting to a network. Additionally, some embodiments may also store credentials on the mobile device 354 for a user account with the system 110. For example, the mobile device 354 may store credentials such as a username and password for communicating with the system 110. These credentials may allow the edge device 350 to use the mobile device 354 to log into the user account, add or remove edge devices from the user account, download or upload data to the user account, and so forth.

When in the unregistered state, the edge device 350 may broadcast a wireless access point 358. The wireless access point 358 may be configured to operate on a local wireless communication protocol. The wireless access point 358 may also be associated with access point credentials that allow a device to connect to the wireless access point 358. For example, the access point credentials for the edge device 350 may include a network ID, a username, password, a device identifier, a secure code, and/or any other type of credential that may be used to authenticate a device requesting access to the network broadcast by the wireless access point 358. The wireless access point 358 may broadcast a local wireless network, referred to as a "first" wireless network merely to distinguish this from other wireless networks.

When registering the edge device 350, the edge device 350 may communicate the access point credentials for connecting to the wireless access point 358 to the mobile device 354. This communication may take place in a number of different forms. For example, FIG. 3 illustrates how the display 352 on the edge device 350 may be configured to display an image that encodes the credentials for connecting to the wireless access point 358. The image displayed on the display 352 may include alphanumeric characters, such as a string or numerical code. In the simplest case, the image may display text that includes a network ID and login credentials for the wireless access point 358. As illustrated in FIG. 3, the display 352 may also display a graphical code 360 that encodes the access point credentials. The graphical code may include a barcode, a Quick Response (QR) code, or any other image that encodes information.

To begin the registration process, the touch screen of the display 352 may receive an input indicating that the user is attempting to register the edge device 350. In response, the display 352 may display an image that encodes the information and/or credentials for the wireless access point 358, such as the graphical code 360. This information from the display 352 may be communicated to the mobile device 354 through a camera of the mobile device 354. For example, the mobile device 354 may run an application ("app") provided from a manufacturer or operator of the system 110. The mobile app may be configured to guide the user through the registration procedure for the edge device 350. The mobile app may retrieve information from the user and prompt the user to capture or input the credentials provided by the display 352 of the edge device 350. For example, the mobile app may activate a camera of the mobile device 354 and provide a prompt to capture an image of the graphical code 360. The camera of the mobile device 354 may be positioned to capture an image of the graphical code 360. The captured graphical code 56 may be displayed on the display of the mobile device 354 when the graphical code 360 is captured by the camera. The mobile app may then be configured to decode the credentials for the wireless access point 358 and use those credentials to connect to the wireless access point 358.

The mobile app operating on the mobile device 354 may then facilitate a connection to the wireless access point 358 using the access point credentials provided through the graphical code 360. For example, the mobile app may decode a network name, ID, password, etc., and use this information to connect to the wireless access point 358. Optionally, the connection between the mobile device 354 and the edge device 350 through the wireless access point 358 may be a secure connection. For example, the mobile device 354 and/or the edge device 350 may provide public keys corresponding to stored private keys that may be used to encrypt communications as they are passed back and forth through the wireless access point 358.

After establishing a connection through the wireless access point 358, the mobile device 354 may provide the edge device 350 with the credentials 362 needed to complete the registration process with the system 110. For example, the mobile device 354 may transmit the credentials 362 for connecting to a local Wi-Fi network, such as a Wi-Fi network broadcast by a local router or enterprise network router. The registration process run by the edge device 350 may be configured to use the SSID and password provided in the credentials 362 from the mobile device 354 to connect to the local Wi-Fi network. Note that this local Wi-Fi network should be distinguished from the local network provided by the wireless access point 358. For example, local network from the wireless access point 358 may be referred to as "first" wireless network and may be generated by the edge device 350. In contrast, the local Wi-Fi network may be referred to as a "second" wireless network that may be generated by a local router or other device that is not necessarily part of the system 110. Also note that a WiFi network represents just one example of a network type that is compatible with these embodiments. For example, a local wired network (e.g., ethernet) may be substituted for the Wi-Fi network without limitation.

After establishing a connection to the local Wi-Fi network, the edge device 350 may now have access to the Internet, and thus may be able to communicate remotely with the rest of the system 110. For example, the system 110 may include web-based APIs or other web interfaces exposed through the Internet that allow multiple edge devices to connect with the system 110 and upload/download data associated with the data sources 102 described above. In order to facilitate the registration process, additional information may be provided with the credentials 362 from the mobile device 354 to complete the registration process by the edge device 350. For example, the credentials 362 may include an account number, and account name, a password, uniform resource locator (URL) for a registration website of the service 110, and/or any other information needed to complete the registration process by the edge device 350.

Figure 4:
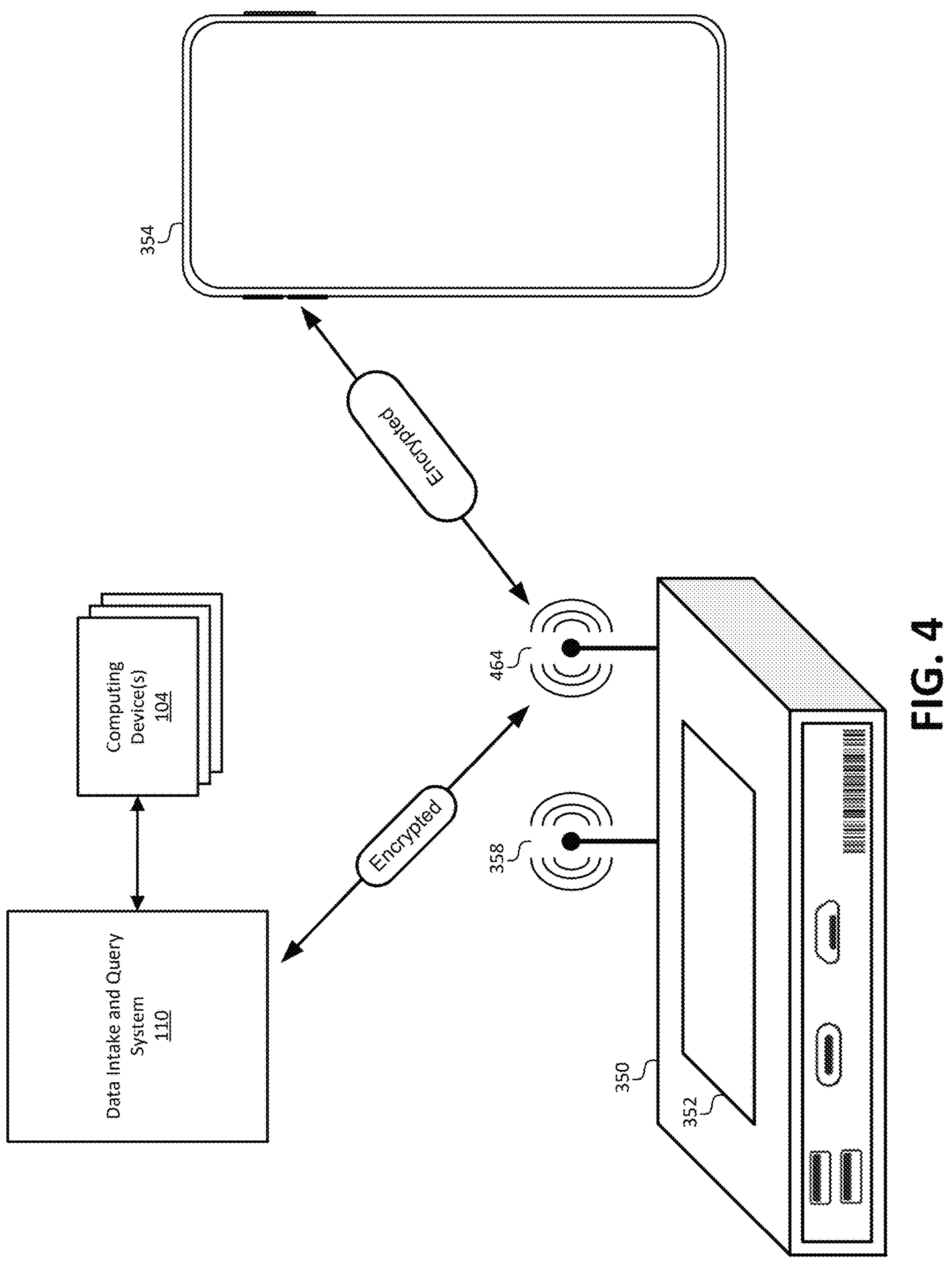
FIG. 4 illustrates an endpoint that may be exposed on the local Wi-Fi network by the edge device, according to some embodiments.

FIG. 4 illustrates an endpoint 464 that may be exposed on the Wi-Fi network broadcast by the edge device 350, according to some embodiments. This endpoint 464 may be used to facilitate communication of data to and from the edge device 350. For example, the mobile device 354 may communicate with the edge device 350 through the endpoint 464 in order to complete the registration process. For example, the credentials for the user account may be used by the mobile device 354 to register the edge device 350 with the system 110.

The endpoint 464 may be configured to use any communication protocol. For example, some embodiments may use the Representational State Transfer (REST) protocol for providing information to complete the registration process. A GET request may be used to retrieve data from the endpoint 464, while PUT/POST requests may be used to send data to the endpoint 464. For example, a list of local wireless networks that are visible to the edge device 350 may be retrieved from the endpoint 464 through a GET request.

Communication with the web interface for the data intake and query system 110 may take place over the Internet. Traditionally, these types of communications have taken place using secure protocols, such as Transport Layer Security (TLS) or the HyperText Transfer Protocol Secure (HTTPS). However, using the traditional secure transfer protocols causes a technical problem for the edge device 350 when these devices are not configured to access the Internet directly, and are thus not able to perform typical validation procedures on the certificates related to TLS/HTTPS. Specifically, these protocols may require the edge device 350 to maintain and/or subscribe to secure certificates associated with the system 110. These certificates would need to be stored, renewed, and maintained over time in order to ensure continued communication between the edge device 350 and the rest of the system 110.

In order to solve this and other technical problems, the edge device 350 may use communication through the endpoint 464 exposed by the edge device 350 so that the communication need not require the traditional TLS or HTTPS communication protocols and certificates usually required for securing network communication. Instead, some embodiments may use a unique public/private key pair for edge device 350 through the endpoint 464. For example, the credentials provided from the mobile device 354 may include a public key for the mobile device 354 generated by the app operating on the mobile device 354. The graphical code 360 may also encode the public key used by the edge device 350, or the public key of the edge device 350 may be provided through the wireless access point 358. Note that this is only one of many different ways in which the public keys may be transmitted between the mobile device 354 and the edge device 350, and this particular technique is not meant to be limiting. Similar methodologies may be used to exchange public keys between the edge device 350 and the web interface for the system 110. More generally, any system communicating with the edge device 350 may receive the public key from the endpoint 464. The edge device 350 may advertise the public key on the endpoint 464 to begin a communication session. For example, edge device 350 may use an SECP256R1 or other elliptic curve encrypted key pair to establish secure communications with the system 110 and/or with the mobile device 354. Specifically, this encrypted key pair between the mobile device 354 and the edge device 350 allows the edge device 350 to communicate without use of HTTPS. This allows the mobile device 354 and/or the system 110 to use secure REST calls over regular HTTP without compromising the security of the communications.

In some embodiments, the communication between the edge device 350 and the mobile device 354 may utilize an external service (e.g., Spacebridge) to establish bidirectional communication and exchange encryption keys. For example, the app running on the mobile device 354 may initiate a communication session with the external service before communicating with the endpoint 464. This generates a session token with an "auth code" to be used to authenticate the edge device 350. The mobile device 354 may then communicate the auth code to the edge device 350 through the endpoint 464.

Once the edge device 350 is registered, the edge device 350 may begin communicating with the external service. If this communication is successful, the edge device 350 may then upload public keys to the external service with the auth code provided from the mobile device 354. The external service is then able to match the edge device 350 with the mobile device 354 using the auth code. The edge device 350 may then receive the public keys for communicating with the mobile device 354 and/or the data intake and query system 110. Once the keys have been exchanged, the app operating on the mobile device 354 may confirm the registration of the edge device 350. At this point, the edge device 350 may then use the public keys to encrypt data before sending the data to other devices. This communication may continue to use the external service as an intermediary message broker.

By foregoing Bluetooth communications or TLS and HTTPS protocols, the embodiments described herein provide a number of technical advantages that improve the performance of the edge device 350 and the system 110 overall. For example, the wireless access point 358 and endpoint 464 solution requires far less maintenance than other traditional approaches. No secure certificates need to be maintained, exchanged, or renewed with the system 110. The edge device 350 may instead redirect these resources to monitoring and retrieving data with its internal and external sensors. The communication of data between the edge device 350 and the mobile device 354 and/or the system 110 may be more efficient without the overhead of TLS and HTTPS protocols. Additionally, the system may still maintain a high level of security by using the public/private key encryption over standard HTTP. The automated exchange of credentials between the edge device 250 and the mobile device 354 may be particularly advantageous for certain types of displays. For example, the display 352 on the edge device 350 may be rather limited for receiving inputs. For example, the automated exchange of credentials described above allows the display 352 to be implemented using a lower power display with a slower response time, since the data exchange does not require an extensive touchscreen keyboard inputs through the display 352.

Figure 5:
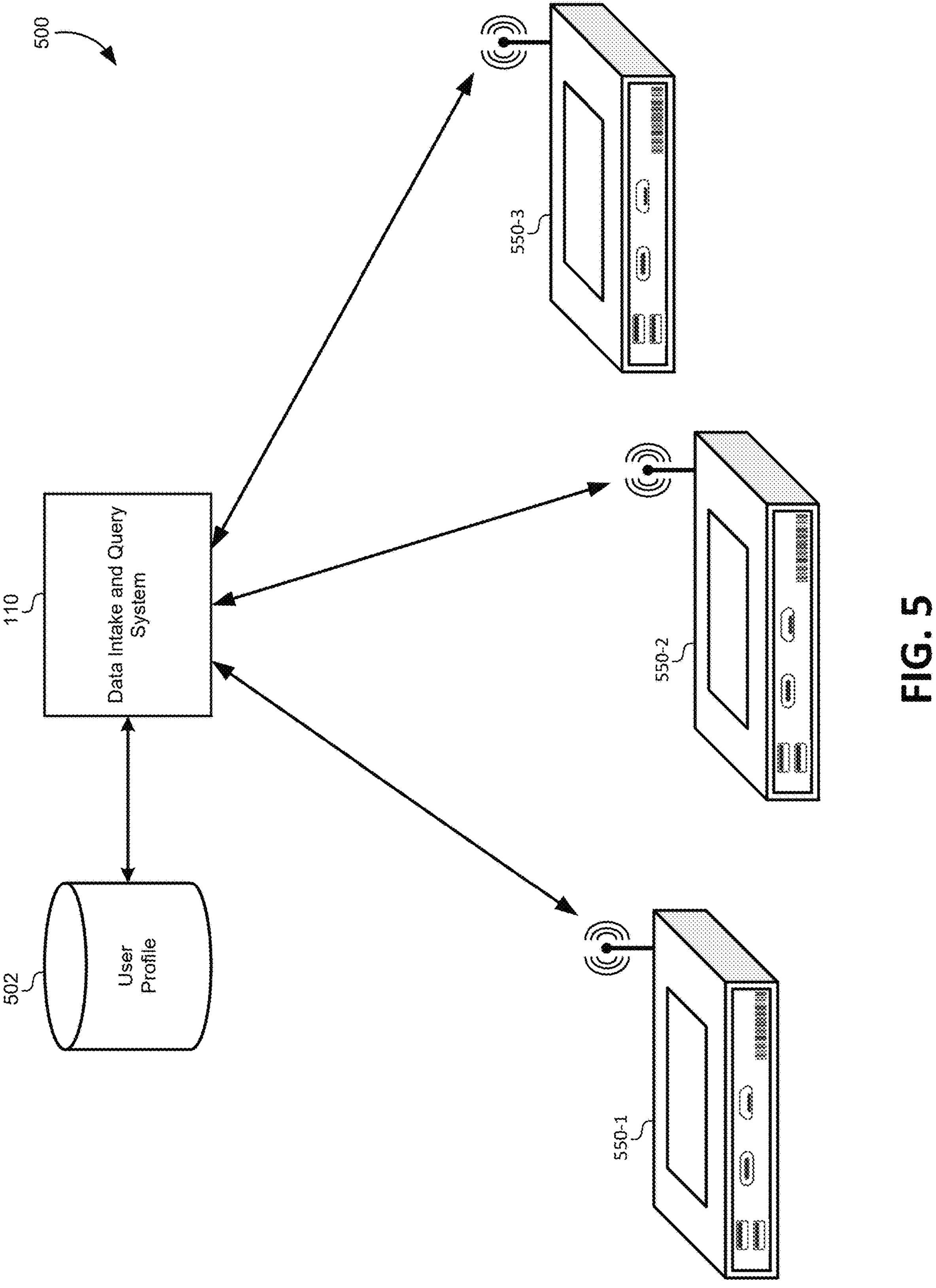
FIG. 5 illustrates a simplified diagram for registering multiple edge devices with a user account on the system, according to some embodiments.

FIG. 5 illustrates a simplified diagram 500 for registering multiple edge devices 550 with a user account on the system 110, according to some embodiments. After registering a first edge device 550-1 with the system 110 as described above, the configuration of the first edge device 550-1 may be configured using the system 110 and/or the mobile device 354. For example, the configuration of the first edge device 550-1 may include numerous settings that govern the operation of the first edge device 550-1. These settings may include sensors sample rates, transmission intervals, power settings, sensor settings, message subscriptions and broadcast settings, installed services, settings for the installed services, and/or any other type of configurable setting for the first edge device 550-1. The app operating on the mobile device 354 may be configured to allow the user to adjust each of the settings in the configuration. Once the registration process finalizes the configuration for the first edge device 550-1, this configuration may be transmitted to the system 110. For example, the configuration information may be stored in a user profile 502 for a user account for which the first edge device 550-1 is registered. Alternatively, the user may configure the settings for each edge device registered with their account in the system 110. Each of the edge devices may then be synchronized with this configuration.

When a second edge device 550-2 is registered with the system 110, the system 110 may optionally allow the configuration for the first edge device 550-1 to be transmitted from the system 110 to the second edge device 550-2. This allows the settings and configurations for new edge devices to be automatically configured based on previous configurations for existing edge devices. For example, when the registration process described above pairs or registers the second edge device 550-2 with the user profile 502, the system 110 may recognize that the first edge device 550-1 is already registered with the user profile 502 and already is associated with an existing configuration. The system 110 may then allow the existing configuration for the first edge device 550-1 to be downloaded and used to automatically configure the second edge device 550-2. For example, the first edge device 550-1 may be installed on a particular type of server rack, and may have a data ingestion configuration that is specifically designed for that type of server rack. If the second edge device 550-2 is installed on a similar type of server rack, the configuration of the first edge device 550-1 may be used to automatically set the data ingestion configuration for the second edge device 550-2.

In addition to transferring an existing configuration from a first edge device 550-1 to a second edge device 550-2 during initial registration and installation, this same technique may be used to automatically update configuration changes across a plurality of similar edge devices. For example, the user profile 502 may store configurations for any/all of the edge devices 550 registered with the user account. The user profile 502 may also store an indication of which edge devices share a common configuration. For example, the first edge device 550-1 and the second edge device 550-2 may share a common configuration when monitoring similar types of data sources. However, the third edge device 550-3 may use a different configuration to monitor a different type of data source. If the mobile device or other computing system makes a change to the configuration of the first edge device 550-1, this change may be used to update or synchronize with the stored configuration in the user profile 502. The system 110 may recognize a change to the stored configuration and identify other installed edge devices that share the same configuration. For example, the system may store a list of edge devices that share the same configuration. Alternatively, the system may identify edge devices that monitor a similar type of environment as the first edge device 550-1. In this example, the system 110 may transmit the updated configuration (or alternatively a change log for the configuration) to the second edge device 550-2. The second edge device 550-2 may then automatically update its configuration based on the changes made to the configuration of the first edge device 550-1. This allows a system administrator to make configuration changes to a single edge device and have that change automatically propagated to all other similar edge devices that are identified as sharing the same configuration.

Note that the configuration for the edge devices may include a wide variety of information. In addition to settings for sensors, services, and other operations, the configuration may also include settings for algorithms and thresholds. For example, an anomaly-detection algorithm may be installed on the first edge device 550-1 to detect an anomaly based on a first threshold. This anomaly-detection algorithm may then be propagated to the second edge device 550-2, and the first threshold may replace a second threshold that was previously used by the second edge device 550-2. In some embodiments, any software application operating on the edge devices 550 may be automatically installed and/or updated using this same technique.

As an example of some of the many configuration settings that may be automatically updated using the techniques described above, FIG. 6 provides examples and descriptions of topics, subscriptions, and other configurable settings, according to some embodiments. FIG. 6 illustrates a block diagram of an example edge device 650. In the illustrated example, the edge device 650 includes a message broker 654 and a set of services 656 that are configured to run on the edge device 650. The message broker 654 may maintain a set of topics 658, a list of subscriptions 662, and a set of retained messages 664. In the illustrated example, a set of topic IDs and client IDs are used by the message broker 654 to distinguish between different topics and clients, respectively. The settings of the internal message broker 654, the external message broker 644, and any of the services 656 may be stored as part of a configuration 669 and automatically installed or updated as part of the registration process.

The illustrated example may represent the contents of the topics 658 and the list of subscriptions 662 at a particular point in time while the message broker 654 is running on the edge device 650. The topics 658 include Topics T.1-T.12, which include topics for different types of sensor measurements, including Topic T.3 for temperature measurements, Topic T.4 for humidity measurements, and Topic T.5 for vibration measurements, as well as topics related to logs (Topic T.6) and anomalies (Topic T.7), among others. As described above, the number of topics in the topics 658 may increase or decrease when new topics are subscribed to or published on or when topics are no longer being subscribed to or published on. For example, new topics added by a change to the configuration 669 to one edge device may be automatically propagated and installed as new topics on similar edge devices.

The list of subscriptions 662 includes subscriptions for clients corresponding to sensors as well as clients corresponding to the services 656. In the illustrated example, the list of subscriptions 662 includes that Client Sensor.1 is subscribed to Topics T.9 and T.10, that Client Service.1 is subscribed to Topics T.3, T.4, and T.5, among others. As shown, multiple clients may be subscribed to a single topic, such as each of Clients Sensor.1, Sensor.2, and Sensor.3 being subscribed to Topics T.9 and T.10. Furthermore, sensor clients as well as service clients may be subscribed to a same topic, such as Clients Sensor.1 and Service.5 being subscribed to Topic T.10. The configuration 669 may store subscriptions for each of the Clients and Sensors for each edge device. For example, changing subscriptions for a certain sensor type at one edge device may propagate the subscription change to other similar edge devices that share the same configuration 669.

The illustrated example also shows several examples for services 656, including an anomaly detection service 656-1, a data streamer service 656-2, a hardware control service 656-3, a registration service 656-4, a user interface (UI) service 656-5, and a sensor management service 656-6. In some examples, the anomaly detection service 656-1 may collect certain sensor data acquired by the sensors and detect anomalies associated with the sensor data. The anomaly detection service 656-1 may employ one or more machine learning (ML) models, where various sensor data is inputted into one or more ML models to generate an output indicative of whether an anomaly was detected. For example, temperature data may be received by the anomaly detection service 656-1 and be inputted into a specific temperature ML model in order to identify anomalies and/or other alert conditions associated with a target operating temperature of a target device, the surrounding environment, or of the edge device 650 itself. The configuration 669 may store types of ML models, training data for ML models, anomaly detection algorithms, anomaly detection thresholds, and other settings for the anomaly detection service 656-1.

In some examples, the data streamer service 656-2 may transmit data collected at the edge device 650 to a data intake and query system 610. The data streamer service 656-2 may subscribe to one or more of the topics 658 in accordance with the configuration 669, which may be obtained (e.g., received) by the data streamer service 656-2 from an external device, such as the system 610. For example, the configuration 669 received by the data streamer service 656-2 may indicate that certain sensor data (e.g., temperature data) is to be sent to the system 610. The data streamer service 656-2 may then subscribe to the corresponding topic (e.g., Topic T.3) and relay data contained in any published messages back to the system 610. The configuration 669 may be received and processed by the data streamer service 656-2 when received as an update from the system 110.

The hardware control service 656-3 may control and manage the hardware components of the edge device 650. The registration service 656-4 may register the edge device 650 with a remote application running on a remote device, allowing the remote device to send configuration 669 to the edge device 650 for modifying the functionality of one or more of the services 665. The UI service 665-5 may manage the UI of the edge device 650 as well as any other I/O devices connected to or integrated with the edge device 650. The sensor management service 656-6 may communicate with one or more connected sensors and perform various actions that change the operation of the sensors (e.g., increase the rate that certain sensor data is measured and/or transmitted).

As illustrated and as described herein, one of the services may include a bridging service 668 for providing a secure bridge between the external message broker 644 and the internal message broker 654. The bridging service 668 is shown as one of the clients in the list of internal subscriptions 662. Though not explicitly shown, the bridging service 668 may also be a client in the list of external subscriptions 664. In some embodiments, the bridging service 668 may exist as a simple bridge to connect external an internal brokers. In other embodiments, the bridging service 668 may act as a service that processes incoming messages from the external broker with a transformation formula, and then forwards those transformed messages to the internal broker. The transformation formula may be implemented in an advanced configuration user interface. Also as illustrated, one or more internal topics 658 (e.g., Topic T.5) may be designated for use with external sensors and is subscribed to the bridging service 668. The designated internal topic 658 receives transformed external sensor data from the bridging service 668. Other services 656 can also be subscribed to the designated internal topic 658, such as to facilitate anomaly detection, data streaming, etc.

In some embodiments, connecting a new external sensor to an edge device may include configuring the new external sensor with the external message broker 644. A full description of this process is described in the commonly assigned U.S. patent application Ser. No. 17/976,676, filed on Oct. 28, 2022, which is incorporated herein by reference. For example, the new external sensor may be subscribed to a number of different topics, and operational settings for the external sensor (e.g., sampling period, power settings, etc.) may be set when installing the sensor. Each of the settings for the new external sensor may be stored in the configuration 669 and uploaded to the system 110. However, this configuration need not be propagated to other similar edge devices unless the same new external sensor is installed on the similar edge devices. For example, if a second edge device shares the same configuration, the system 110 may detect when the new external sensor is also connected to the second edge device and automatically download the portion of the configuration 669 that relates to the new external sensor in the second edge device. Therefore, a new edge device may only need to be configured a single time, and thereafter additional devices may be automatically configured to use the new external sensor when the external sensor is connected to additional edge devices for the user account.

Figure 7:
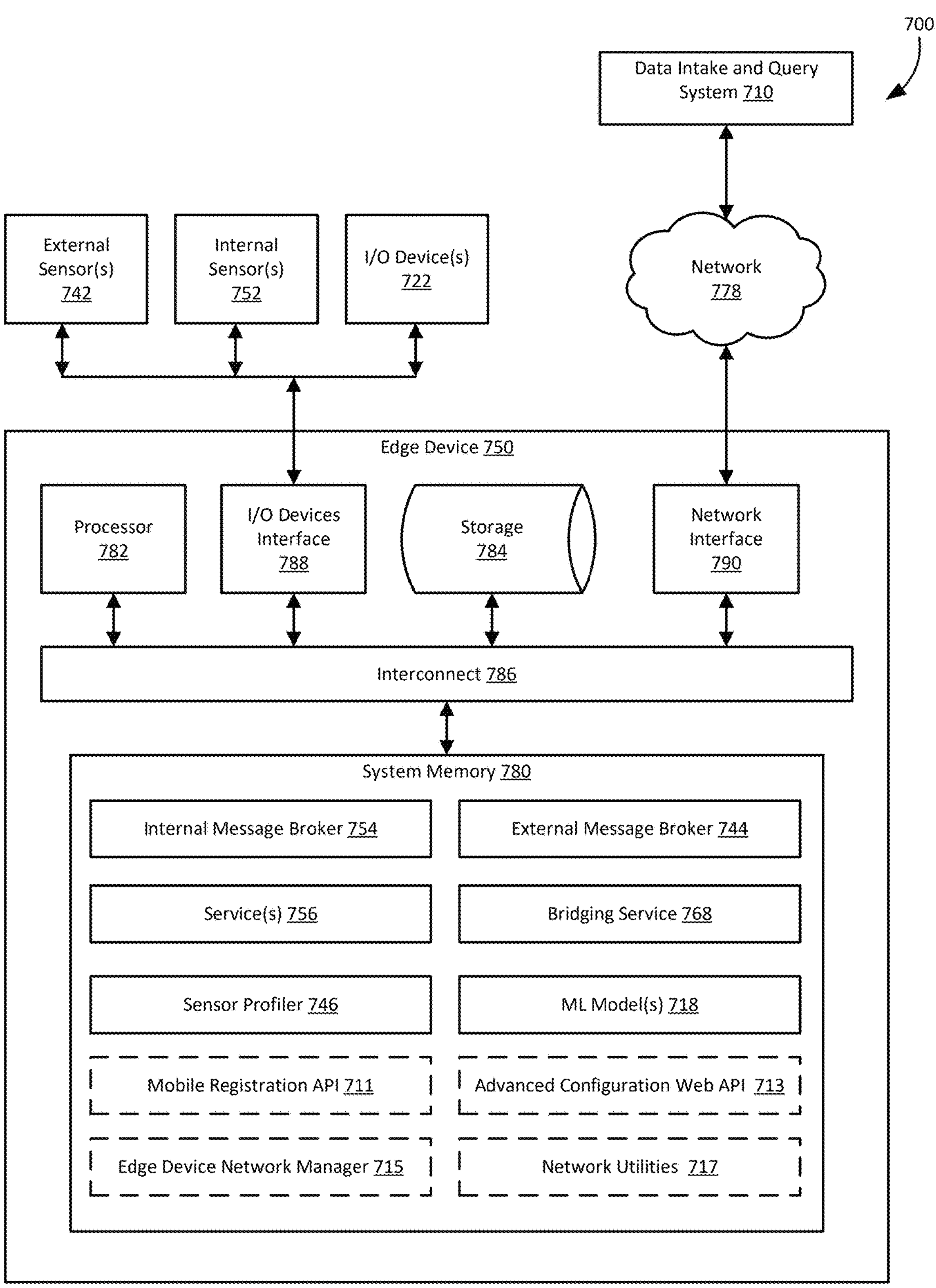
FIG. 7 illustrates a block diagram of an example edge device within a data processing environment.

FIG. 7 illustrates a block diagram of an example edge device 750 within a data processing environment 700. As shown, the data processing environment 700 may include, without limitation, a data intake and query system 710 and an edge device 750 communicating with one another over one or more communications networks 778. The edge device 750 may include, without limitation, a processor 782, storage 784, an input/output (I/O) device interface 788, a network interface 790, an interconnect 786, and system memory 780. The system memory 780 may include an internal message broker 754, an external message broker 744, one or more services 756, a bridging service 768 (i.e., which may be implemented as one of the services 756, but is shown separately for added clarity). The system memory 780 can optionally include a sensor profiler 746 and one or more ML models 718.

In general, the processor 782 may retrieve and execute programming instructions stored in the system memory 780, such as to implement the internal message broker 754, external message broker 744, services 756, bridging service 768, sensor profiler 746, ML models 718, and/or any operating system stored therein. The processor 782 may be any technically-feasible form of a processing device configured to process data and execute program code. The processor 782 could be, for example, a central processing unit (CPU), a graphics processing unit (GPU), an application-specific integrated circuit (ASIC), a field-programmable gate array (FPGA), and so forth. The processor 782 stores and retrieves application data residing in the system memory 780. The processor 782 is included to be representative of a single CPU, multiple CPUs, a single CPU having multiple processing cores, and the like. In operation, the processor 782 is the manager processor of the edge device 750, controlling and coordinating operations of the other system components.

The storage 784 may be a disk drive storage device. Although shown as a single unit, the storage 784 may be a combination of fixed and/or removable storage devices, such as fixed disc drives, floppy disc drives, tape drives, removable memory cards, or optical storage, network attached storage (NAS), or a storage area-network (SAN). The processor 782 may communicate to other computing devices and systems via the network interface 790, where the network interface 790 is configured to transmit and receive data via the communications network 778.

The interconnect 786 facilitates transmission, such as of programming instructions and application data, between the processor 782, the input/output (I/O) device interface 788, the storage 784, the network interface 790, and the system memory 780. The I/O device interface 788 is configured to transmit and receive data to and from one or more internal sensors 752, external sensors 742, and I/O devices 722. The I/O devices 722 may include one or more input devices (e.g., a keyboard, buttons, stylus, microphone, etc.) and/or one or more output devices (e.g., speaker, light-emitting diodes, etc.). In some instances, the I/O devices 722 includes a display device that displays an image and, in some examples, is integrated with the edge device 750. In various examples, the display device 724 may be a liquid crystal display (LCD) display, organic light-emitting diode (OLED) display, or a digital light processing (DLP) display. In some instances, the internal sensors 752 and/or external sensors 742 may include a camera that acquires images via a lens and converts the images into digital form, which may then be displayed on the display device.

The internal sensors 752 and/or external sensors 742 may include one or more of a variety of sensor types such as, without limitation, a light sensor, an image capture device (e.g., a camera), a sound sensor (e.g., microphone), a vibration sensor, one or more accelerometers (for measuring accelerations in one or more directions), one or more gyroscopes (for measuring rotations in one or more directions), a pressure sensor, a humidity sensor, a gas sensor (e.g., a CO2 sensor), a location sensor (e.g., a Global Navigation Satellite System (GNSS) receiver), among other possibilities. As described herein, the internal sensors 752 and/or external sensors 742 may be physically disposed internally or externally to edge device 750, and they may communicate with the I/O device interface 788 via wired and/or wireless communication links. Further, though not explicitly shown, the internal sensors 752 and/or external sensors 742 may include, or may be coupled via, an intermediate sensor hub. The I/O device interface 788 includes physical and/or logical ports for interfacing with sensors, sensor hubs, etc.

The edge device 750 may include a number of software processes that may be stored in the system memory 780 and that are executed as part of the registration process described above. These additional software processes may be used for more advanced configurations of the network connections during the registration process. For example, the process described above to register edge devices may work very well for local networks with an SSID and password configuration. However, edge devices are often installed in enterprise environments with more complex network requirements and security protocols. In these situations, it is often impossible to configure a connection to a local network for the edge device without providing additional settings, credentials, or information during the registration process. A number of these software processes in FIG. 7 may facilitate the registration for edge devices in both simple and complex local networks. These software processes may include a mobile registration API 711, an advanced configuration web API 713, an edge device network manager 715, and various network utilities 717.

Figure 8A:
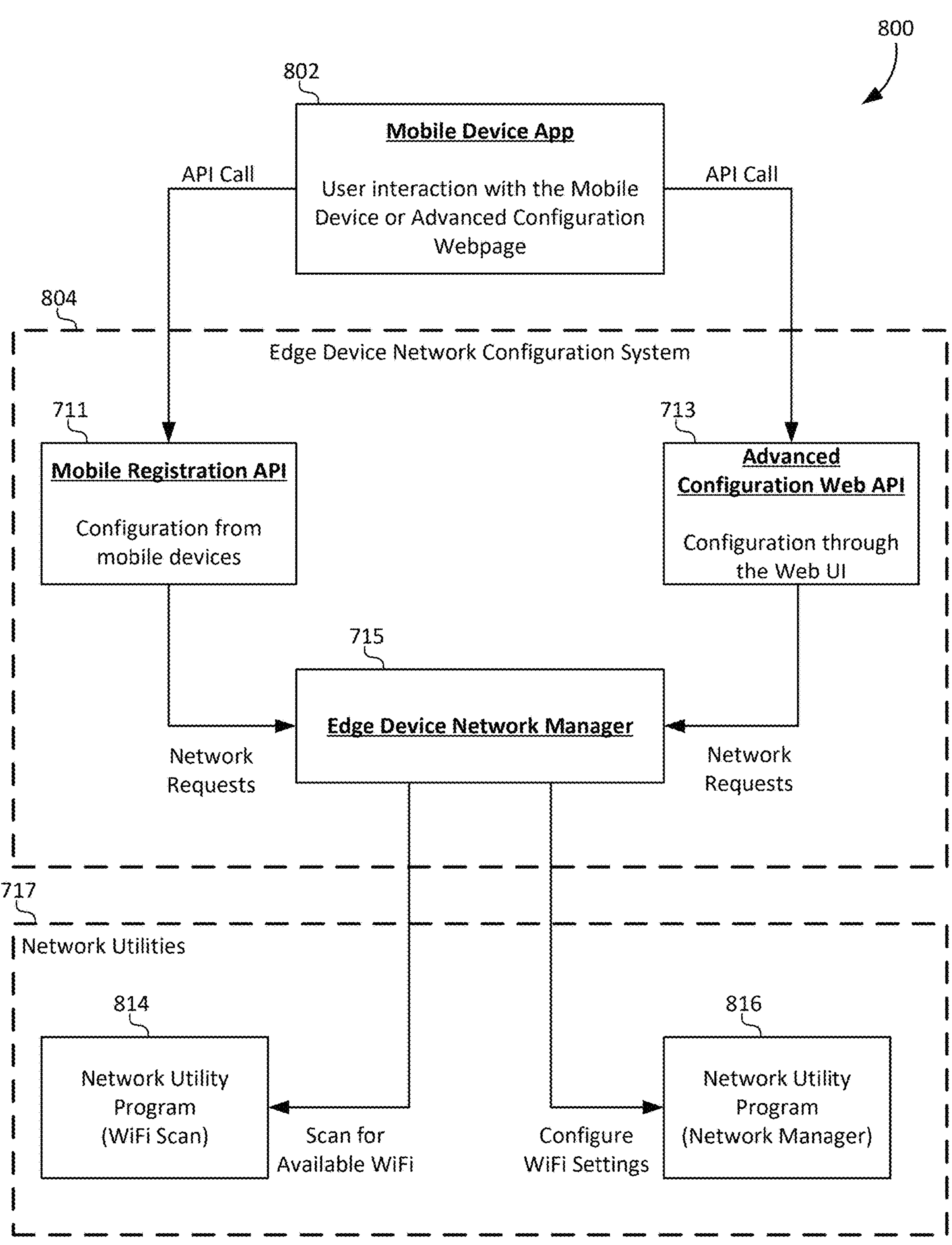
FIG. 8A illustrates a data flow diagram for registering an edge device using utilities and processes provided by the edge device, according to some embodiments.

FIG. 8A illustrates a data flow diagram for registering an edge device using utilities and processes provided by the edge device, according to some embodiments. As described above, a mobile device (e.g., a smart phone) may receive inputs and interactions from the user. In some implementations, the mobile device may provide the credentials and other information for the registration process through the secure endpoint provided by the edge device. The mobile device may receive interactions through an app 802 operating on the mobile device, and the app 802 may interact with the mobile registration API 711 executing on the edge device.

The mobile registration API 711 may provide various functions that allow the user to configure advanced settings for the network. For example, the endpoint exposed by the edge device may provide API functions that allow REST requests to be posted to the endpoint using HTTP as described above.

A computing device may communicate with the advanced configuration web API 713. For example, a computing device operating a web browser on the same network as the edge device may access the advanced configuration web API 713. The computing device may be on the same local network as the edge device, or may sign onto the access point hosted by the edge device. For example, the mobile device may ask the user if they wish to attempt a "simple" configuration mode that may be performed entirely in the mobile app. Alternatively, the user may select an "advanced" configuration mode that may be performed via the webpage on the Web server. The advanced configuration mode may include options—such as setting a static IP address—that may not be available in the simple configuration mode. If the advanced configuration mode is selected, the Web server may be initiated, otherwise the process may continue entirely in the mobile app. For example, the mobile app may inform the mobile registration API that the registration will continue in the advanced configuration mode. This may cause the server to activate the advanced configuration server. From this point, the registration may continue in the webpage instead of in the mobile app. In some embodiments, the edge device may load/run a Web server that is made available for the advanced configuration web API 713. This Web server and the associated API functions may allow a user to perform various network requests during registration. The Web server and the associated API functions may be performed using network time protocol (NTP) settings that will support he edge device operation, but which may be outside of the scope of the registration. These utilities may also include diagnostic tools that may be used for network registration, including an ability to run connectivity checks to the services that will communicate, download logs, and execute other operations. Information may be passed through the REST interface using the mobile registration API 711 as described above.

For establishing a connection to an enterprise network, additional interactions with the network may also be facilitated through the advanced configuration web API 713. For example, the mobile device (e.g., a smartphone or laptop device) may load a website provided by the Web server with a field to provide a static IP address to be used by the edge device. When configuring the Wi-Fi connection for an enterprise network, the mobile registration API 711 and/or the advanced configuration web API 713 may be used to connect to the enterprise network using a Pre-Shared Key (PSK) protocol, an IEEE 802.1X authentication protocol, a MS-CHAPv2 authentication protocol, and/or any other network protocol used by the enterprise network. The mobile registration API 711 may allow the mobile app 802 to provide any network-specific fields that are also required during the registration process to connect to the enterprise network. The webpage provided by the advanced configuration web API 713 may allow the mobile device to enter any fields or other information depending on the network environment. This allows the edge device to be compatible with any type of network configuration using any type of protocol or login routine.

While the Web server provides the advanced configuration web API 713, the display on the edge device may be configured to display information for connecting to the advanced configuration web API 713. For example, the display may provide a URL along with any credentials needed to log into the advanced configuration web API 713. The webpage may then be loaded on the mobile device or accessed through the mobile app 802 and used to provide the more advanced settings and/or registration information for connecting to an enterprise network or other or complex network environments. Providing the webpage through the advanced configuration web API 713 provides a far more convenient interface for providing this registration information compared to the limited interactions that may be available through the display of the edge device.

The edge device network manager 715 may receive network requests that are provided from the mobile registration API 711 and/or the advanced configuration web API 713. Various network utilities 717 may also operate on the edge device. For example, a network utility program 814 (e.g., a Linux utility program) may scan the area for available Wi-Fi networks. Some embodiments may also characterize the available Wi-Fi networks based on a signal strength. Additionally, based on the network requests received from the mobile registration API 711 and/or the advanced configuration web API 713, the network utility program 814 may limit or filter the available Wi-Fi networks based on the registration information. For example, the available networks may be filtered to only return networks that require specific authentication protocols (e.g., PSK, WPA/WPA2, IEEE 802.1X, MS-CHAPv2, etc.). These Wi-Fi networks may be returned to the edge device network manager 715 and displayed through the advanced configuration web API 713. When the network configuration information is provided through the advanced configuration web API 713, a network utility program 816 may act as a network manager to configure the Wi-Fi settings.

Figure 8B:
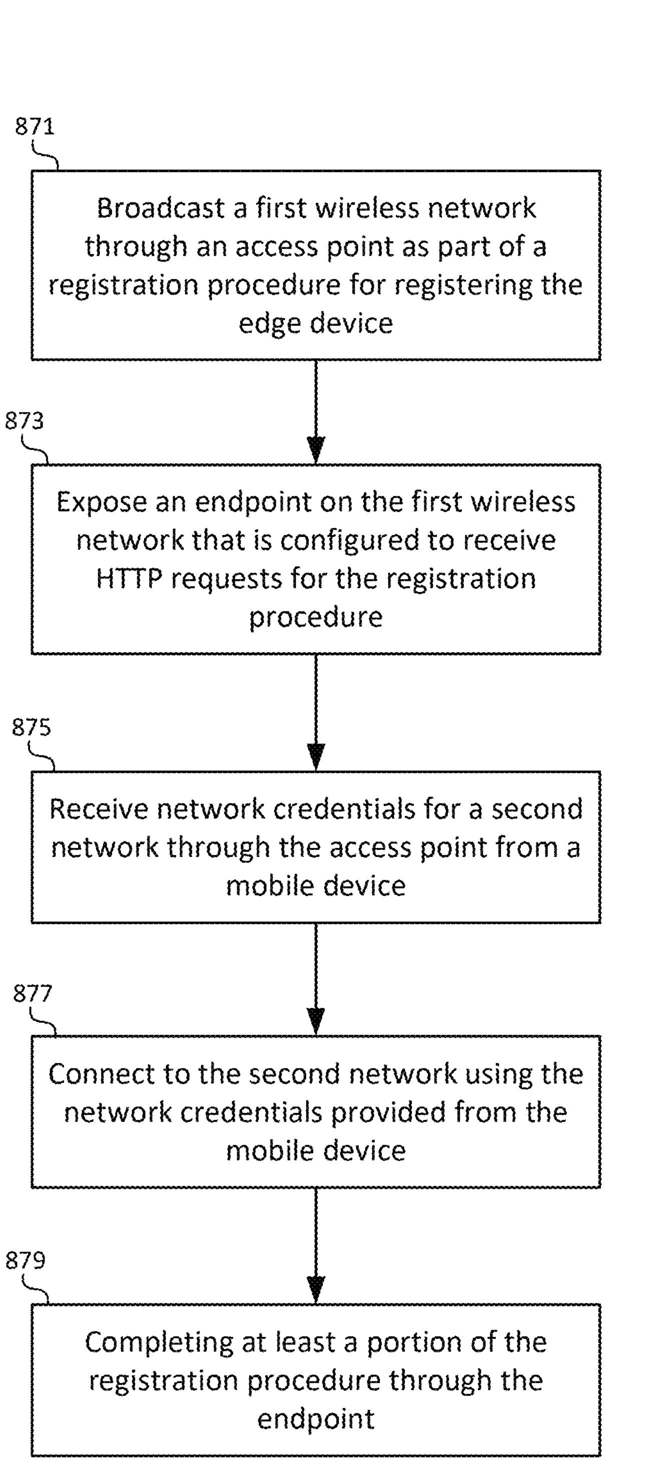
FIG. 8B illustrates a flowchart of a method for registering an edge device with a user account, according to some embodiments.

FIG. 8B illustrates a flowchart 850 of a method for registering an edge device with a user account, according to some embodiments. The method may be carried out by an edge device, which as described above may include a housing, a display screen, one or more processors, and one or more non-transitory, computer-readable media storing instructions that cause the processors to perform the operations described below. The operations may begin to be executed when the edge device is in an unregistered state, and the registration procedure may be used to connect the edge device to a local wireless network and to pair or register the edge device with a user account at the data intake and query system.

The method may include broadcasting a first wireless network through an access point as part of a registration procedure for registering the edge device with a user account for the data intake and query system (871). In some embodiments, the access point credentials may be provided by the edge device to the mobile device. These access point credentials may allow the mobile device to connect to the edge device through the access point. The access point credentials may be provided in the form of a code, such as a graphical code that encodes the credentials and is displayed on the display of the edge device. The first wireless network may be a local network broadcast by the access point of the edge device.

The method may also include the edge device exposing an endpoint on the first wireless network (873). The endpoint may be configured to receive HTTP requests for the registration procedure. The endpoint need not require HTTPS of TLS protocols, but may instead exchange encryption keys with the mobile device to facilitate secure communication. The endpoint may include a REST endpoint configured to exchange information with the mobile device and/or the data intake and query system. The mobile endpoint may allow the mobile device to communicate directly with the edge device during the registration procedure.

The method may also include receiving, by the edge device, network credentials for a second network (875). The network credentials for the second wireless (or wired) network may be received through the access point from the mobile device. This mobile device may include a smart phone and may be used to perform at least a part of the registration procedure by providing a user interface for the user. The mobile device may operate a mobile app that is configured to walk the user through the registration process.

The method may further include connecting the edge device to the second network using the network credentials provided from the mobile device (877). In some embodiments, the edge device may operate network utilities that allow the edge device to scan available wireless networks that are detectable by the edge device. These wireless networks may be characterized based on a detected signal strength. The edge device may filter this list of available networks based on one or more security protocols. The filtered list of available wireless networks may be provided to the mobile device as part of the registration procedure.

The method may further include completing at least a portion of the registration procedure through the endpoint (879). For example, the edge device may provide API functions through the endpoint that may be accessed by the app operating on the mobile device. The edge device may also run a Web server that allows for more complex configuration when connecting to the second network. For example, a URL for the Web server may be provided on a display screen of the edge device, and the mobile device may access the URL to provide additional information, such as a static IP address, additional security credentials, and so forth.

The registration procedure may include generating a configuration that configures the operation of sensors, services, and other features of the edge device. For example, the edge device may include sensors configured to log data from a surrounding environment. The configuration may include settings for the sensors, power settings, algorithms for detecting anomalies based on the sensor data, and so forth. The configuration may be transmitted to the user account to be used when registering other similar edge devices with the user account. For example the configuration may be stored in the user account present in the data intake and query system. The configuration may then be pushed to the edge device and/or to other registered edge devices. Similarly, the registration procedure may include receiving an existing configuration from another edge device, and using the existing configuration to configure the current edge device. After completing the registration procedure, changes to the configuration may be transmitted back to the user account to dynamically update other edge devices sharing the same configuration.

Various examples of systems and methods are described herein with reference to data intake and query systems and related environments. For added clarity, aspects of such environments are described further below. Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 9:
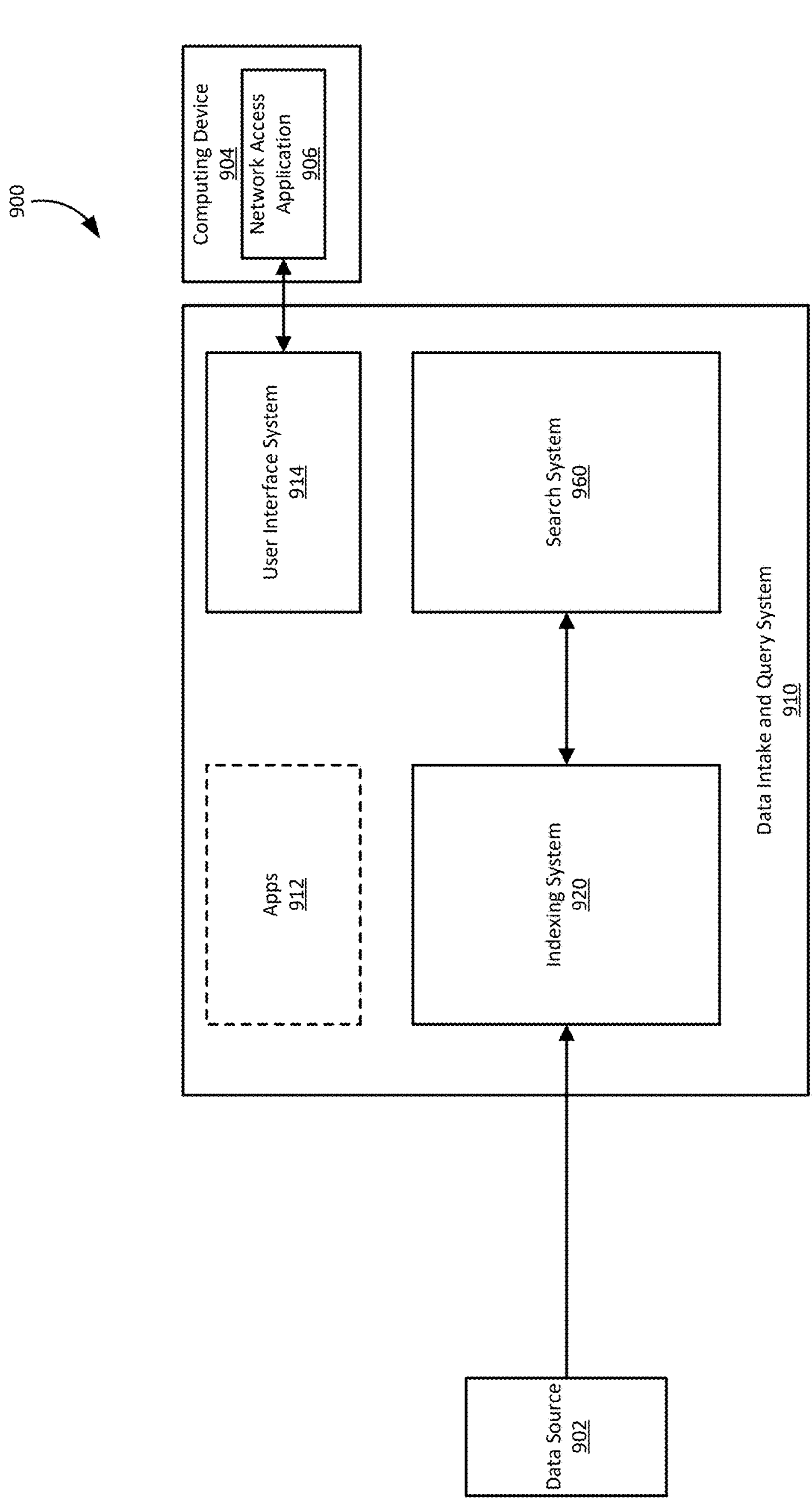
FIG. 9 is a block diagram illustrating an example computing environment that includes a data intake and query system.

FIG. 9 is a block diagram illustrating an example computing environment 900 that includes a data intake and query system 910. The data intake and query system 910 obtains data from a data source 902 in the computing environment 900 and ingests the data using an indexing system 920. A search system 960 of the data intake and query system 910 enables users to navigate the indexed data. Though drawn with separate boxes, in some implementations the indexing system 920 and the search system 960 can have overlapping components. A computing device 904, running a network access application 906, can communicate with the data intake and query system 910 through a user interface system 914 of the data intake and query system 910. Using the computing device 904, a user can perform various operations with respect to the data intake and query system 910, such as administration of the data intake and query system 910, management and generation of "knowledge objects," initiating of searches, and generation of reports, among other operations. The data intake and query system 910 can further optionally include apps 912 that extend the search, analytics, and/or visualization capabilities of the data intake and query system 910.

The data intake and query system 910 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 910 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 910 can execute on a single computing device, or may be distributed over multiple computing devices. For example, the program code can include instructions for executing both indexing and search components (which may be part of the indexing system 920 and/or the search system 960, respectively), and can be executed on a computing device that also provides the data source 902. As another example, the program code can execute on one computing device, where the program code executes both indexing and search components, while another copy of the program code executes on a second computing device that provides the data source 902. As another example, the program code can execute only an indexing component or only a search component. In this example, a first instance of the program code that is executing the indexing component and a second instance of the program code that is executing the search component can be executing on the same computing device or on different computing devices.

The data source 902 of the computing environment 900 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 902 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 920 obtains machine date from the data source 902 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 920 does not require prior knowledge of the structure of incoming data (e.g., the indexing system 920 does not need to be provided with a schema describing the data). Additionally, the indexing system 920 retains a copy of the data as it was received by the indexing system 920 such that the original data is always available for searching (e.g., no data is discarded, though, in some examples, the indexing system 920 can be configured to do so).

The search system 960 searches the data stored by the indexing system 920. As discussed in greater detail below, the search system 960 enables users associated with the computing environment 900 (and possibly also other users) to navigate the data, generate reports, and visualize results in "dashboards" output using a graphical interface. Using the facilities of the search system 960, users can obtain insights about the data, such as retrieving events from an index, calculating metrics, searching for specific conditions within a rolling time window, identifying patterns in the data, and predicting future trends, among other examples. To achieve greater efficiency, the search system 960 can apply map-reduce methods to parallelize searching of large volumes of data. Additionally, because the original data is available, the search system 960 can apply a schema to the data at search time. This allows different structures to be applied to the same data, or for the structure to be modified if or when the content of the data changes. Application of a schema at search time may be referred to herein as a late-binding schema technique.

The user interface system 914 provides mechanisms through which users associated with the computing environment 900 (and possibly others) can interact with the data intake and query system 910. These interactions can include configuration, administration, and management of the indexing system 920, initiation and/or scheduling of queries to the search system 960, receipt or reporting of search results, and/or visualization of search results. The user interface system 914 can include, for example, facilities to provide a command line interface or a web-based interface.

Users can access the user interface system 914 using a computing device 904 that communicates with data intake and query system 910, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 900. For example, a person can log in as a particular user and, using the user's digital information, can access the data intake and query system 910. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 904 can provide a human-machine interface through which a person can have a digital presence in the computing environment 900 in the form of a user. The computing device 904 is an electronic device having one or more processors and a memory capable of storing instructions for execution by the one or more processors. The computing device 904 can further include input/output (I/O) hardware and a network interface. Applications executed by the computing device 904 can include a network access application 906, which can a network interface of the client computing device 904 to communicate, over a network, with the user interface system 914 of the data intake and query system 910. The user interface system 914 can use the network access application 906 to generate user interfaces that enable a user to interact with the data intake and query system 910. A web browser is one example of a network access application. A shell tool can also be used as a network access application. In some examples, the data intake and query system 910 is an application executing on the computing device 904. In such examples, the network access application 906 can access the user interface system 914 without needed to go over a network.

The data intake and query system 910 can optionally include apps 912. An app of the data intake and query system 910 is a collection of configurations, knowledge objects (a user-defined entity that enriches the data in the data intake and query system 910), views, and dashboards that may provide additional functionality, different techniques for searching the data, and/or additional insights into the data. The data intake and query system 910 can execute multiple applications simultaneously. Example applications include an information technology service intelligence application, which can monitor and analyze the performance and behavior of the computing environment 900, and an enterprise security application, which can include content and searches to assist security analysts in diagnosing and acting on anomalous or malicious behavior in the computing environment 900.

Though FIG. 9 illustrates only one data source, in practical implementations, the computing environment 900 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 900, the data intake and query system 910 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 900 can include on-prem and cloud-based computing resources, or only cloud-based resources. For example, an entity may have on-prem computing devices and a private cloud. In this example, the entity operates the data intake and query system 910 and can choose to execute the data intake and query system 910 on an on-prem computing device or in the cloud. In another example, a provider entity operates the data intake and query system 910 in a public cloud and provides the functionality of the data intake and query system 910 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 910. In some implementations, the entity providing the data intake and query system 910 is itself subscribing to the cloud services of a cloud service provider. As an example, a first entity provides computing resources under a public cloud service model, a second entity subscribes to the cloud services of the first provider entity and uses the cloud computing resources to operate the data intake and query system 910, and a third entity can subscribe to the services of the second provider entity in order to use the functionality of the data intake and query system 910. In this example, the data sources are associated with the third entity, users accessing the data intake and query system 910 are associated with the third entity, and the analytics and insights provided by the data intake and query system 910 are for purposes of the third entity's operations.

Figure 10:
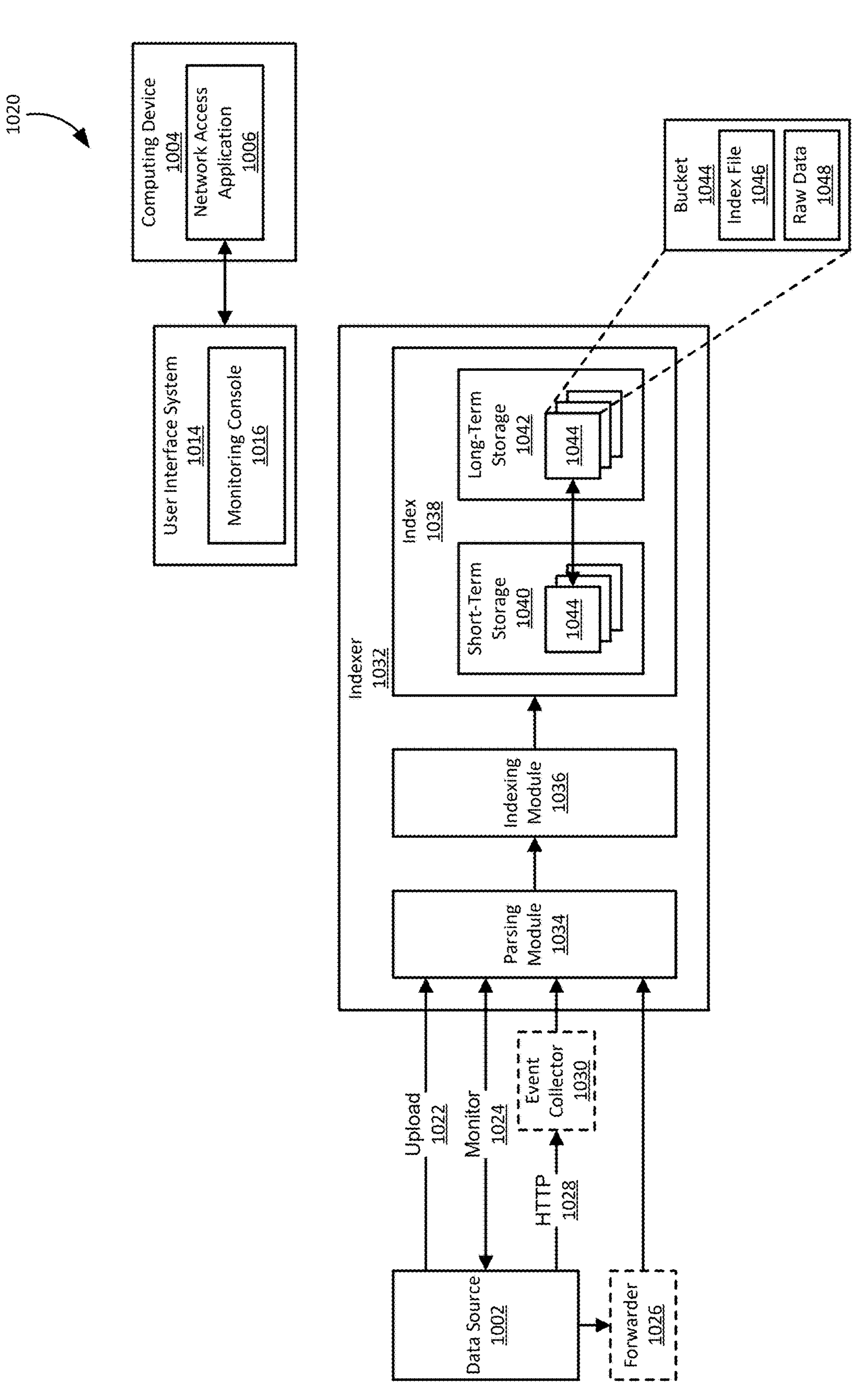
FIG. 10 is a block diagram illustrating in greater detail an example of an indexing system of a data intake and query system.

FIG. 10 is a block diagram illustrating in greater detail an example of an indexing system 1020 of a data intake and query system, such as the data intake and query system 910 of FIG. 9. The indexing system 1020 of FIG. 10 uses various methods to obtain machine data from a data source 1002 and stores the data in an index 1038 of an indexer 1032. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1020 enables the data intake and query system to obtain the machine data produced by the data source 1002 and to store the data for searching and retrieval.

Users can administer the operations of the indexing system 1020 using a computing device 1004 that can access the indexing system 1020 through a user interface system 1014 of the data intake and query system. For example, the computing device 1004 can be executing a network access application 1006, such as a web browser or a terminal, through which a user can access a monitoring console 1016 provided by the user interface system 1014. The monitoring console 1016 can enable operations such as: identifying the data source 1002 for indexing; configuring the indexer 1032 to index the data from the data source 1002; configuring a data ingestion method; configuring, deploying, and managing clusters of indexers; and viewing the topology and performance of a deployment of the data intake and query system, among other operations. The operations performed by the indexing system 1020 may be referred to as "index time" operations, which are distinct from "search time" operations that are discussed further below.

The indexer 1032, which may be referred to herein as a data indexing component, coordinates and performs most of the index time operations. The indexer 1032 can be implemented using program code that can be executed on a computing device. The program code for the indexer 1032 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1032. In some implementations, the indexer 1032 executes on the computing device 1004 through which a user can access the indexing system 1020. In some implementations, the indexer 1032 executes on a different computing device.

The indexer 1032 may be executing on the computing device that also provides the data source 1002 or may be executing on a different computing device. In implementations wherein the indexer 1032 is on the same computing device as the data source 1002, the data produced by the data source 1002 may be referred to as "local data." In other implementations the data source 1002 is a component of a first computing device and the indexer 1032 executes on a second computing device that is different from the first computing device. In these implementations, the data produced by the data source 1002 may be referred to as "remote data." In some implementations, the first computing device is "on-prem" and in some implementations the first computing device is "in the cloud." In some implementations, the indexer 1032 executes on a computing device in the cloud and the operations of the indexer 1032 are provided as a service to entities that subscribe to the services provided by the data intake and query system.

For a given data produced by the data source 1002, the indexing system 1020 can be configured to use one of several methods to ingest the data into the indexer 1032. These methods include upload 1022, monitor 1024, using a forwarder 1026, or using HyperText Transfer Protocol (HTTP 1028) and an event collector 1030. These and other methods for data ingestion may be referred to as "getting data in" (GDI) methods.

Using the upload 1022 method, a user can instruct the indexing system to 1002 to specify a file for uploading into the indexer 1032. For example, the monitoring console 1016 can include commands or an interface through which the user can specify where the file is located (e.g., on which computing device and/or in which directory of a file system) and the name of the file. Once uploading is initiated, the indexer 1032 processes the file, as discussed further below. Uploading is a manual process and occurs when instigated by a user. For automated data ingestion, the other ingestion methods are used.

The monitor 1024 method enables the indexing system 1020 to monitor the data source 1002 and continuously or periodically obtain data produced by the data source 1002 for ingestion by the indexer 1032. For example, using the monitoring console 1016, a user can specify a file or directory for monitoring. In this example, the indexing system 1020 can execute a monitoring process that detects whenever data is added to the file or directory and causes the data to be sent to the indexer 1032. As another example, a user can specify a network port for monitoring. In this example, a monitoring process can capture data received at or transmitting from the network port and cause the data to be sent to the indexer 1032. In various examples, monitoring can also be configured for data sources such as operating system event logs, performance data generated by an operating system, operating system registries, operating system directory services, and other data sources.

Monitoring is available when the data source 1002 is local to the indexer 1032 (e.g., the data source 1002 is on the computing device where the indexer 1032 is executing). Other data ingestion methods, including forwarding and the event collector 1030, can be used for either local or remote data sources.

A forwarder 1026, which may be referred to herein as a data forwarding component, is a software process that sends data from the data source 1002 to the indexer 1032. The forwarder 1026 can be implemented using program code that can be executed on the computer device that provides the data source 1002. A user launches the program code for the forwarder 1026 on the computing device that provides the data source 1002. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1026 can provide various capabilities. For example, the forwarder 1026 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1026 can break the data into individual events (event generation is discussed further below) and send the events to a receiver. Other operations that the forwarder 1026 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1030 provides an alternate method for obtaining data from the data source 1002. The event collector 1030 enables data and application events to be sent to the indexer 1032 using HTTP 1028. The event collector 1030 can be implemented using program code that can be executing on a computing device. The program code may be a component of the data intake and query system or can be a standalone component that can be executed independently of the data intake and query system and operates in cooperation with the data intake and query system.

To use the event collector 1030, a user can, for example using the monitoring console 1016 or a similar interface provided by the user interface system 1014, enable the event collector 1030 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1002 as an alternative method to using a username and password for authentication.

To send data to the event collector 1030, the data source 1002 is supplied with a token and can then send HTTP 1028 requests to the event collector 1030. To send HTTP 1028 requests, the data source 1002 can be configured to use an HTTP client and/or to use logging libraries such as those supplied by Java, JavaScript, and .NET libraries. An HTTP client enables the data source 1002 to send data to the event collector 1030 by supplying the data, and a Uniform Resource Identifier (URI) for the event collector 1030 to the HTTP client. The HTTP client then handles establishing a connection with the event collector 1030, transmitting a request containing the data, closing the connection, and receiving an acknowledgment if the event collector 1030 sends one. Logging libraries enable HTTP 1028 requests to the event collector 1030 to be generated directly by the data source. For example, an application can include or link a logging library, and through functionality provided by the logging library manage establishing a connection with the event collector 1030, transmitting a request, and receiving an acknowledgement.

An HTTP 1028 request to the event collector 1030 can contain a token, a channel identifier, event metadata, and/or event data. The token authenticates the request with the event collector 1030. The channel identifier, if available in the indexing system 1020, enables the event collector 1030 to segregate and keep separate data from different data sources. The event metadata can include one or more key-value pairs that describe the data source 1002 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1030 extracts events from HTTP 1028 requests and sends the events to the indexer 1032. The event collector 1030 can further be configured to send events or event data to one or more indexers. Extracting the events can include associating any metadata in a request with the event or events included in the request. In these implementations, event generation by the indexer 1032 (discussed further below) is bypassed, and the indexer 1032 moves the events directly to indexing. In some implementations, the event collector 1030 extracts event data from a request and outputs the event data to the indexer 1032, and the indexer generates events from the event data. In some implementations, the event collector 1030 sends an acknowledgement message to the data source 1002 to indicate that the event collector 1030 has received a particular request form the data source 1002, and/or to indicate to the data source 1002 that events in the request have been added to an index.

The indexer 1032 ingests incoming data and transforms the data into searchable knowledge in the form of events. In the data intake and query system, an event is a single piece of data that represents activity of the component represented in FIG. 10 by the data source 1002. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1032 can include a parsing module 1034 and an indexing module 1036 for generating and storing the events. The parsing module 1034 and indexing module 1036 can be modular and pipelined, such that one component can be operating on a first set of data while the second component is simultaneously operating on a second sent of data. Additionally, the indexer 1032 may at any time have multiple instances of the parsing module 1034 and indexing module 1036, with each set of instances configured to simultaneously operate on data from the same data source or from different data sources. The parsing module 1034 and indexing module 1036 are illustrated to facilitate discussion, with the understanding that implementations with other components are possible to achieve the same functionality.

The parsing module 1034 determines information about event data, where the information can be used to identify events within the event data. For example, the parsing module 1034 can associate a source type with the event data. A source type identifies the data source 1002 and describes a possible data structure of event data produced by the data source 1002. For example, the source type can indicate which fields to expect in events generated at the data source 1002 and the keys for the values in the fields, and possibly other information such as sizes of fields, an order of the fields, a field separator, and so on. The source type of the data source 1002 can be specified when the data source 1002 is configured as a source of event data. Alternatively, the parsing module 1034 can determine the source type from the event data, for example from an event field or using machine learning.

Other information that the parsing module 1034 can determine includes timestamps. In some cases, an event includes a timestamp as a field, and the timestamp indicates a point in time when the action represented by the event occurred or was recorded by the data source 1002 as event data. In these cases, the parsing module 1034 may be able to determine from the source type associated with the event data that the timestamps can be extracted from the events themselves. In some cases, an event does not include a timestamp and the parsing module 1034 determines a timestamp for the event, for example from a name associated with the event data from the data source 1002 (e.g., a file name when the event data is in the form of a file) or a time associated with the event data (e.g., a file modification time). As another example, when the parsing module 1034 is not able to determine a timestamp from the event data, the parsing module 1034 may use the time at which it is indexing the event data. As another example, the parsing module 1034 can use a user-configured rule to determine the timestamps to associate with events.

The parsing module 1034 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1034 may be able to determine event boundaries from the source type associated with the event data, for example from a data structure indicated by the source type. In some implementations, a user can configure rules the parsing module 1034 can use to identify event boundaries.

The parsing module 1034 can further extract data from events and possibly also perform transformations on the events. For example, the parsing module 1034 can extract a set of fields for each event, such as a host or hostname, source or source name, and/or source type. The parsing module 1034 may extract certain fields by default or based on a user configuration. Alternatively or additionally, the parsing module 1034 may add fields to events, such as a source type or a user-configured field. As another example of a transformation, the parsing module 1034 can anonymize fields in events to mask sensitive information, such as social security numbers or account numbers. Anonymizing fields can include changing or replacing values of specific fields. The parsing component 1034 can further perform user-configured transformations.

The parsing module 1034 outputs the results of processing incoming event data to the indexing module 1036, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1032 can be configured to identify searchable segments that are parts of fields, searchable segments that are entire fields, or both. The parsing module 1034 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1046, to find event data that matches a search query. In some implementations, segmentation can alternatively be performed by the forwarder 1026. Segmentation can also be disabled, in which case the indexer 1032 will not build a lexicon for the event data. When segmentation is disabled, the search system searches the event data directly.

Building index data structures generates the index 1038. The index 1038 is a storage data structure on a storage device (e.g., a disk drive or other physical device for storing digital data). The storage device may be a component of the computing device on which the indexer 1032 is operating (referred to herein as local storage) or may be a component of a different computing device (referred to herein as remote storage) that the indexer 1038 has access to over a network. The indexer 1032 can include more than one index and can include indexes of different types. For example, the indexer 1032 can include event indexes, which impose minimal structure on stored data and can accommodate any type of data. As another example, the indexer 1032 can include metrics indexes, which use a highly structured format to handle the higher volume and lower latency demands associated with metrics data.

The indexing module 1036 organizes files in the index 1038 in directories referred to as buckets. The files in a bucket 1044 can include raw data files, index files, and possibly also other metadata files. As used herein, "raw data" means data as when the data was produced by the data source 1002, without alteration to the format or content. As noted previously, the parsing component 1034 may add fields to event data and/or perform transformations on fields in the event data, and thus a raw data file 1048 can include, in addition to or instead of raw data, what is referred to herein as enriched raw data. The raw data file 1048 may be compressed to reduce disk usage. An index file 1046, which may also be referred to herein as a "time-series index" or tsidx file, contains metadata that the indexer 1032 can use to search a corresponding raw data file 1048. As noted above, the metadata in the index file 1046 includes a lexicon of the event data, which associates each unique keyword in the event data in the raw data file 1048 with a reference to the location of event data within the raw data file 1048. The keyword data in the index file 1046 may also be referred to as an inverted index. In various implementations, the data intake and query system can use index files for other purposes, such as to store data summarizations that can be used to accelerate searches.

A bucket 1044 includes event data for a particular range of time. The indexing module 1036 arranges buckets in the index 1038 according to the age of the buckets, such that buckets for more recent ranges of time are stored in short-term storage 1040 and buckets for less recent ranges of time are stored in long-term storage 1042. Short-term storage 1040 may be faster to access while long-term storage 1042 may be slower to access. Buckets may move from short-term storage 1040 to long-term storage 1042 according to a configurable data retention policy, which can indicate at what point in time a bucket is old enough to be moved.

A bucket's location in short-term storage 1040 or long-term storage 1042 can also be indicated by the bucket's status. As an example, a bucket's status can be "hot," "warm," "cold," "frozen," or "thawed." In this example, hot bucket is one to which the indexer 1032 is writing data and the bucket becomes a warm bucket when the index 1032 stops writing data to it. In this example, both hot and warm buckets reside in short-term storage 1040. Continuing this example, when a warm bucket is moved to long-term storage 1042, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1020 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 1020 through the monitoring console 1016 provided by the user interface system 1014. Using the monitoring console 1016, the user can configure and monitor an index cluster, and see information such as disk usage by an index, volume usage by an indexer, index and volume size over time, data age, statistics for bucket types, and bucket settings, among other information.

Figure 11:
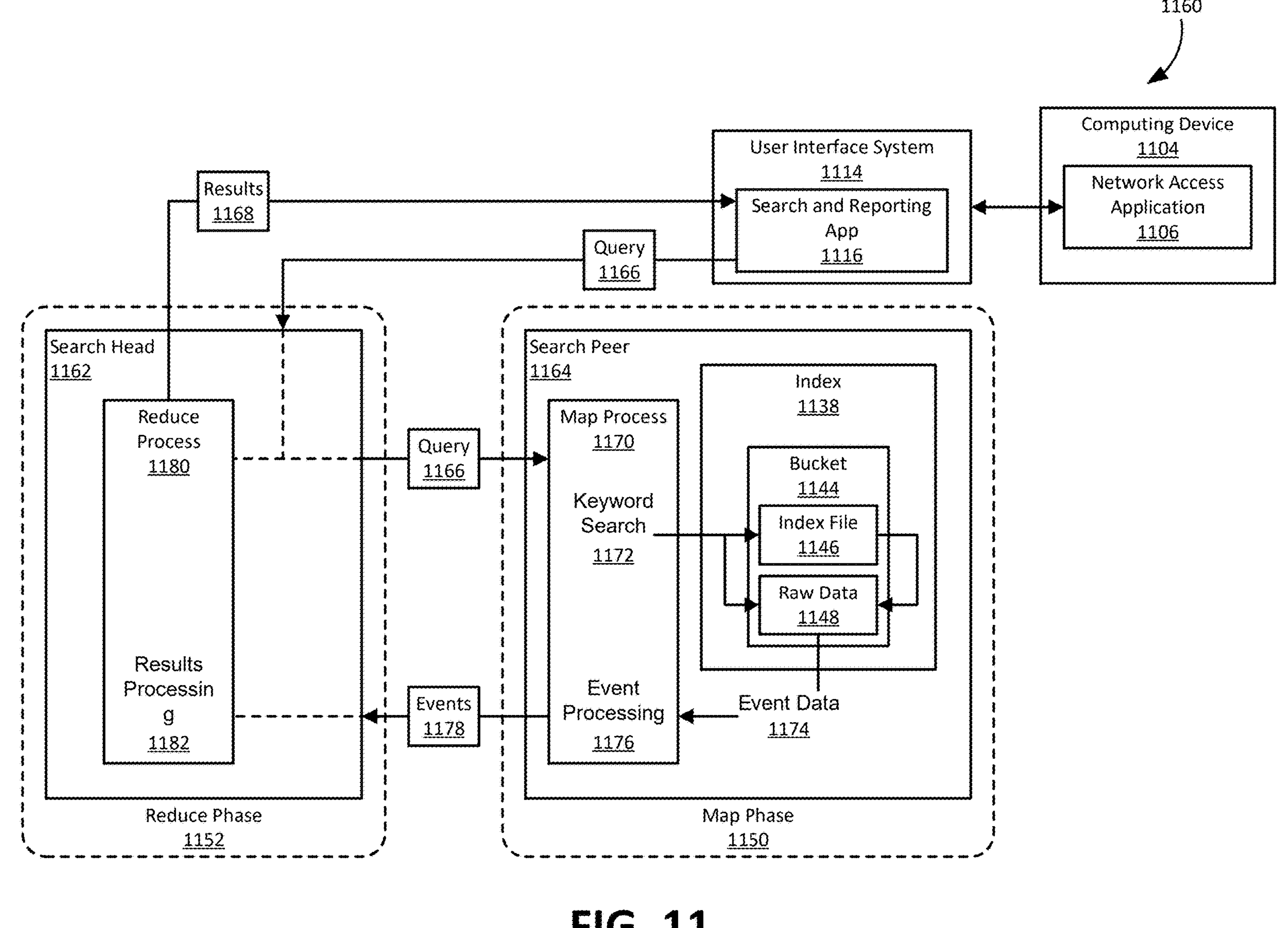
FIG. 11 is a block diagram illustrating in greater detail an example of the search system of a data intake and query system.

FIG. 11 is a block diagram illustrating in greater detail an example of the search system 1160 of a data intake and query system, such as the data intake and query system 910 of FIG. 9. The search system 1160 of FIG. 11 issues a query 1166 to a search head 1162, which sends the query 1166 to a search peer 1164. Using a map process 1170, the search peer 1164 searches the appropriate index 1138 for events identified by the query 1166 and sends events 1178 so identified back to the search head 1162. Using a reduce process 1182, the search head 1162 processes the events 1178 and produces results 1168 to respond to the query 1166. The results 1168 can provide useful insights about the data stored in the index 1138. These insights can aid in the administration of information technology systems, in security analysis of information technology systems, and/or in analysis of the development environment provided by information technology systems.

The query 1166 that initiates a search is produced by a search and reporting app 1116 that is available through the user interface system 1114 of the data intake and query system. Using a network access application 1106 executing on a computing device 1104, a user can input the query 1166 into a search field provided by the search and reporting app 1116. Alternatively or additionally, the search and reporting app 1116 can include pre-configured queries or stored queries that can be activated by the user. In some cases, the search and reporting app 1116 initiates the query 1166 when the user enters the query 1166. In these cases, the query 1166 maybe referred to as an "ad-hoc" query. In some cases, the search and reporting app 1116 initiates the query 1166 based on a schedule. For example, the search and reporting app 1116 can be configured to execute the query 1166 once per hour, once per day, at a specific time, on a specific date, or at some other time that can be specified by a date, time, and/or frequency. These types of queries maybe referred to as scheduled queries.

The query 1166 is specified using a search processing language. The search processing language includes commands that the search peer 1164 will use to identify events to return in the search results 1168. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1166 to include sequential commands, where a subsequent command may operate on the results of a prior command. As an example, sequential commands may be separated in the query 1166 by a vertical line ("|" or "pipe") symbol.

In addition to one or more search commands, the query 1166 includes a time indicator. The time indicator limits searching to events that have timestamps described by the indicator. For example, the time indicator can indicate a specific point in time (e.g., 11:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1166 occurs in two broad phases: a map phase 1150 and a reduce phase 1152. The map phase 1150 takes place across one or more search peers. In the map phase 1150, the search peers locate event data that matches the search terms in the search query 1166 and sorts the event data into field-value pairs. When the map phase 1150 is complete, the search peers send events that they have found to one or more search heads for the reduce phase 1152. During the reduce phase 1152, the search heads process the events through commands in the search query 1166 and aggregate the events to produce the final search results 1168.

A search head, such as the search head 1162 illustrated in FIG. 11, is a component of the search system 1160 that manages searches. The search head 1162, which may also be referred to herein as a search management component, can be implemented using program code that can be executed on a computing device. The program code for the search head 1162 can be stored on a non-transitory computer-readable medium and from this medium can be loaded or copied to the memory of a computing device. One or more hardware processors of the computing device can read the program code from the memory and execute the program code in order to implement the operations of the search head 1162.

Upon receiving the search query 1166, the search head 1162 directs the query 1166 to one or more search peers, such as the search peer 1164 illustrated in FIG. 11. "Search peer" is an alternate name for "indexer" and a search peer may be largely similar to the indexer described previously. The search peer 1164 may be referred to as a "peer node" when the search peer 1164 is part of an indexer cluster. The search peer 1164, which may also be referred to as a search execution component, can be implemented using program code that can be executed on a computing device. In some implementations, one set of program code implements both the search head 1162 and the search peer 1164 such that the search head 1162 and the search peer 1164 form one component. In some implementations, the search head 1162 is an independent piece of code that performs searching and no indexing functionality. In these implementations, the search head 1162 may be referred to as a dedicated search head.

The search head 1162 may consider multiple criteria when determining whether to send the query 1166 to the particular search peer 1164. For example, the search system 1160 may be configured to include multiple search peers that each have duplicative copies of at least some of the event data. In this example, sending the search query 1166 to more than one search peer allows the search system 1160 to distribute the search workload across different hardware resources. As another example, search system 1160 may include different search peers for different purposes (e.g., one has an index storing a first type of data or from a first data source while a second has an index storing a second type of data or from a second data source). In this example, the search query 1166 may specify which indexes to search, and the search head 1162 will send the query 1166 to the search peers that have those indexes.

To identify events 1178 to send back to the search head 1162, the search peer 1164 performs a map process 1170 to obtain event data 1174 from the index 1138 that is maintained by the search peer 1164. During a first phase of the map process 1170, the search peer 1164 identifies buckets that have events that are described by the time indicator in the search query 1166. As noted above, a bucket contains events whose timestamps fall within a particular range of time. For each bucket 1144 whose events can be described by the time indicator, during a second phase of the map process 1170, the search peer 1164 performs a keyword search 1174 using search terms specified in the search query 1166. The search terms can be one or more of keywords, phrases, fields, Boolean expressions, and/or comparison expressions that in combination describe events being searched for. When segmentation is enabled at index time, the search peer 1164 performs the keyword search 1172 on the bucket's index file 1146. As noted previously, the index file 1146 includes a lexicon of the searchable terms in the events stored in the bucket's raw data 1148 file. The keyword search 1172 searches the lexicon for searchable terms that correspond to one or more of the search terms in the query 1166. As also noted above, the lexicon includes, for each searchable term, a reference to each location in the raw data 1148 file where the searchable term can be found. Thus, when the keyword search identifies a searchable term in the index file 1146 that matches query 1166, the search peer 1164 can use the location references to extract from the raw data 1148 file the event data 1174 for each event that includes the searchable term.

In cases where segmentation was disabled at index time, the search peer 1164 performs the keyword search 1172 directly on the raw data 1148 file. To search the raw data 1148, the search peer 1164 may identify searchable segments in events in a similar manner as when the data was indexed. Thus, depending on how the search peer 1164 is configured, the search peer 1164 may look at event fields and/or parts of event fields to determine whether an event matches the query 1166. Any matching events can be added to the event data 1174 read from the raw data 1148 file. The search peer 1164 can further be configured to enable segmentation at search time, so that searching of the index 1138 causes the search peer 1164 to build a lexicon in the index file 1146.

The event data 1174 obtained from the raw data 1148 file includes the full text of each event found by the keyword search 1172. During a third phase of the map process 1170, the search peer 1164 performs event processing 1176 on the event data 1174, with the steps performed being determined by the configuration of the search peer 1164 and/or commands in the search query 1166. For example, the search peer 1164 can be configured to perform field discovery and field extraction. Field discovery is a process by which the search peer 1164 identifies and extracts key-value pairs from the events in the event data 1174. The search peer 1164 can, for example, be configured to automatically extract the first 110 fields (or another number of fields) in the event data 1174 that can be identified as key-value pairs. As another example, the search peer 1164 can extract any fields explicitly mentioned in the search query 1166. The search peer 1164 can, alternatively or additionally, be configured with particular field extractions to perform.

Other examples of steps that can be performed during event processing 1176 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1164 sends processed events 1178 to the search head 1162, which performs a reduce process 1180. The reduce process 1180 potentially receives events from multiple search peers and performs various results processing 1182 steps on the events. The results processing 1182 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1182 can further include applying commands from the search query 1166 to the events. The query 1166 can include, for example, commands for evaluating and/or manipulating fields (e.g., to generate new fields from existing fields or parse fields that have more than one value). As another example, the query 1166 can include commands for calculating statistics over the events, such as counts of the occurrences of fields, or sums, averages, ranges, and so on, of field values. As another example, the query 1166 can include commands for generating statistical values for purposes of generating charts of graphs of the events.

Through results processing 1182, the reduce process 1180 produces the events found by processing the search query 1166, as well as some information about the events, which the search head 1162 outputs to the search and reporting app 1116 as search results 1168. The search and reporting app 1116 can generate visual interfaces for viewing the search results 1168. The search and reporting app 1116 can, for example, output visual interfaces for the network access application 1106 running on a computing device 1104 to generate.

The visual interfaces can include various visualizations of the search results 1168, such as tables, line or area charts, Chloropleth maps, or single values. The search and reporting app 1116 can organize the visualizations into a dashboard, where the dashboard includes a panel for each visualization. A dashboard can thus include, for example, a panel listing the raw event data for the events in the search results 1168, a panel listing fields extracted at index time and/or found through field discovery along with statistics for those fields, and/or a timeline chart indicating how many events occurred at specific points in time (as indicated by the timestamps associated with each event). In various implementations, the search and reporting app 1116 can provide one or more default dashboards. Alternatively or additionally, the search and reporting app 1116 can include functionality that enables a user to configure custom dashboards.

The search and reporting app 1116 can also enable further investigation into the events in the search results 1116. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1166. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:

broadcasting, by an edge device, a first wireless network through an access point as part of a registration procedure for registering the edge device with a user account for a data intake and query system;

exposing, by the edge device, an endpoint on the first wireless network, wherein the endpoint is configured to exchange Hypertext Transfer Protocol (HTTP) requests for the registration procedure;

receiving, by the edge device, network credentials for a second network, wherein the network credentials are received through the access point from a mobile device being used to perform at least a part of the registration procedure;

connecting, by the edge device, to the second network using the network credentials provided from the mobile device; and completing, by the edge device, at least a portion of the registration procedure through the endpoint.

2. The computer-implemented method of claim 1, wherein the endpoint is configured for secure communication using HTTP by exchanging encryption keys with the mobile device.

3. The computer-implemented method of claim 2, wherein the endpoint is configured to not require Hypertext Transfer Protocol Secure (HTTPS) or other transport layer security protocols.

4. The computer-implemented method of claim 1, wherein the endpoint comprises a Representational State Transfer (REST) endpoint configured to exchange information with the mobile device as part of the registration procedure for registering the edge device.

5. The computer-implemented method of claim 1, wherein the mobile device and the edge device communicate directly via the endpoint on the first wireless network.

6. The computer-implemented method of claim 1, further comprising scanning, by the edge device, available wireless networks that are detectable by the edge device, and characterizing the available wireless networks based on a signal strength.

7. The computer-implemented method of claim 6, further comprising filtering, by the edge device, the available wireless networks based on one or more security protocols.

8. The computer-implemented method of claim 7, further comprising providing, by the edge device, a filtered list of the available wireless networks to the mobile device via the endpoint.

9. An edge device comprising:

one or more processors; and one or more non-transitory, computer-readable media having stored thereon instructions that, when executed by the one or more processors, cause the one or more processors to perform operations comprising:

broadcasting, by an edge device, a first wireless network through an access point as part of a registration procedure for registering the edge device with a user account for a data intake and query system;

exposing, by the edge device, an endpoint on the first wireless network, wherein the endpoint is configured to exchange Hypertext Transfer Protocol (HTTP) requests for the registration procedure;

receiving, by the edge device, network credentials for a second network, wherein the network credentials are received through the access point from a mobile device being used to perform at least a part of the registration procedure;

connecting, by the edge device, to the second network using the network credentials provided from the mobile device; and completing, by the edge device, at least a portion of the registration procedure through the endpoint.

10. The edge device of claim 9, further comprising:

a housing surrounding the one or more processors and the one or more non-transitory, computer-readable media; and a display configured to display information for the registration procedure.

11. The edge device of claim 10, wherein the operations further comprise providing, by the edge device, access point credentials to the mobile device, wherein the access point credentials allow the mobile device to connect to the edge device through the access point.

12. The edge device of claim 11, wherein the operations further comprise encoding the access point credentials into a graphical code that is displayed on the display of the edge device.

13. The edge device of claim 9, wherein the edge device is one of a plurality of edge devices registered with the user account, and the plurality of edge devices include sensors that are configured to log data from a surrounding environment.

14. The edge device of claim 9, wherein the operations further comprise exposing, by the edge device, Application Programming Interface (API) functions on the endpoint through which settings are received for connecting to an enterprise network.

15. The edge device of claim 9, wherein the operations further comprise running, by the edge device, a Web server, wherein a Uniform Resource Locator (URL) for the Web server is provided on a display screen of the edge device.

16. One or more non-transitory, computer-readable media having stored thereon instructions that, when executed by one or more processors, cause the one or more processors to perform operations comprising:

broadcasting, by an edge device, a first wireless network through an access point as part of a registration procedure for registering the edge device with a user account for a data intake and query system;

exposing, by the edge device, an endpoint on the first wireless network, wherein the endpoint is configured to exchange Hypertext Transfer Protocol (HTTP) requests for the registration procedure;

receiving, by the edge device, network credentials for a second network, wherein the network credentials are received through the access point from a mobile device being used to perform at least a part of the registration procedure;

connecting, by the edge device, to the second network using the network credentials provided from the mobile device; and completing, by the edge device, at least a portion of the registration procedure through the endpoint.

17. The one or more non-transitory, computer-readable media of claim 16, wherein the operations further comprise:

receiving, by the edge device, a configuration for the edge device to configure operation of sensors or services operated by the edge device; and causing, by the edge device, the configuration to be transmitted to be stored with the user account to update other edge devices registered with the user account.

18. The one or more non-transitory, computer-readable media of claim 17, wherein the configuration comprises an algorithm used to detect anomalies based on sensor data received by the edge device.

19. The one or more non-transitory, computer-readable media of claim 16, wherein the operations further comprise:

receiving, by the edge device, a configuration as part of the registration procedure, wherein the configuration was received from another edge device registered with the user account; and configuring the edge device using the configuration.

20. The one or more non-transitory, computer-readable media of claim 16, wherein the operations further comprise:

after completing the registration procedure, receiving, by the edge device, a change to a configuration of the edge device; and in response to receiving the change to the configuration, transmitting, by the edge device, the configuration to the user account to be transmitted to other edge devices registered with the user account.

* * * * *